United States Patent
Bye

(10) Patent No.: US 8,094,629 B2
(45) Date of Patent: Jan. 10, 2012

(54) WIRELESS LOCAL AREA NETWORK REAL-TIME QUALITY MANAGEMENT

(75) Inventor: Richard A. Bye, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 1562 days.

(21) Appl. No.: 10/780,146

(22) Filed: Feb. 17, 2004

(65) Prior Publication Data

US 2004/0252676 A1 Dec. 16, 2004

Related U.S. Application Data

(60) Provisional application No. 60/472,647, filed on May 22, 2003.

(51) Int. Cl.
*H04W 4/00* (2009.01)

(52) U.S. Cl. ........ 370/338; 370/310; 370/328; 370/329; 370/465; 370/466; 455/23; 455/42; 455/102

(58) Field of Classification Search .................. 370/338, 370/310, 328, 329, 465, 466; 455/23, 42, 455/102, 435.1
See application file for complete search history.

(56) References Cited

U.S. PATENT DOCUMENTS

| 6,646,995 | B1 * | 11/2003 | Le Strat et al. | 370/252 |
| 7,242,932 | B2 * | 7/2007 | Wheeler et al. | 455/435.1 |
| 7,260,060 | B1 * | 8/2007 | Abaye et al. | 370/230 |
| 7,443,879 | B2 * | 10/2008 | Ejzak et al. | 370/465 |
| 2003/0007471 | A1 * | 1/2003 | Terasawa et al. | 370/335 |
| 2004/0037314 | A1 * | 2/2004 | Spear | 370/466 |
| 2004/0160979 | A1 * | 8/2004 | Pepin et al. | 370/462 |
| 2004/0203451 | A1 * | 10/2004 | Braun et al. | 455/67.11 |

* cited by examiner

*Primary Examiner* — Wayne Cai

(74) *Attorney, Agent, or Firm* — Garlick Harrison & Markison; Holly L. Rudnick

(57) ABSTRACT

The present invention provides a Wireless Local Area Network (WLAN) terminal, having a wireless interface that exchanges packetized communications with servicing Access Points (APs). A processing unit communicatively coupled to the wireless interface selects an appropriate programmable COder/DECoder (CODEC) with which to convert incoming packetized communications to incoming user communications, and outgoing user communications to outgoing packetized communications. A user interface coupled to the programmable CODEC receives the incoming user communications and produces the outgoing user communications. The processing unit monitors the serviced packetized communications to determine a communication quality level delivered by the wireless interface. Then the processing unit chooses the selected coding scheme based upon the communication quality level.

31 Claims, 22 Drawing Sheets

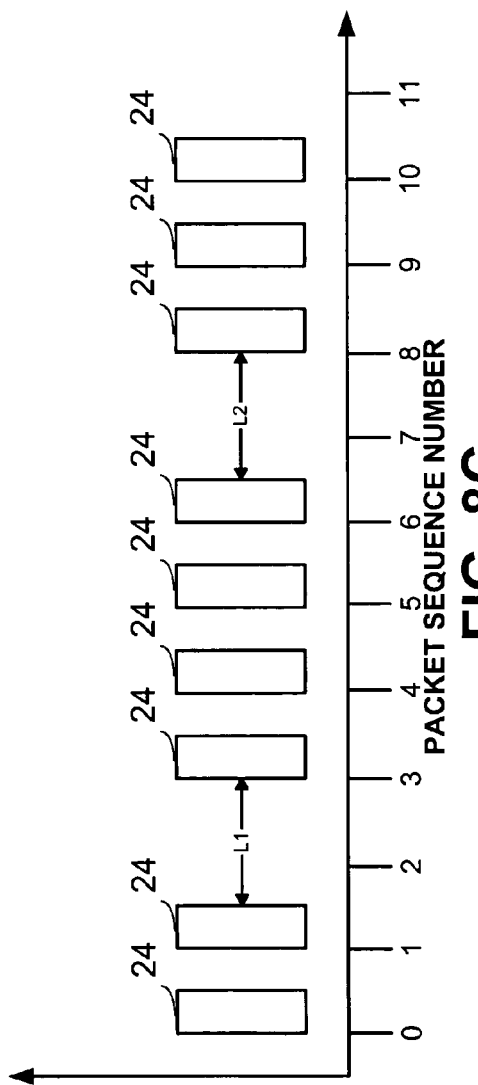
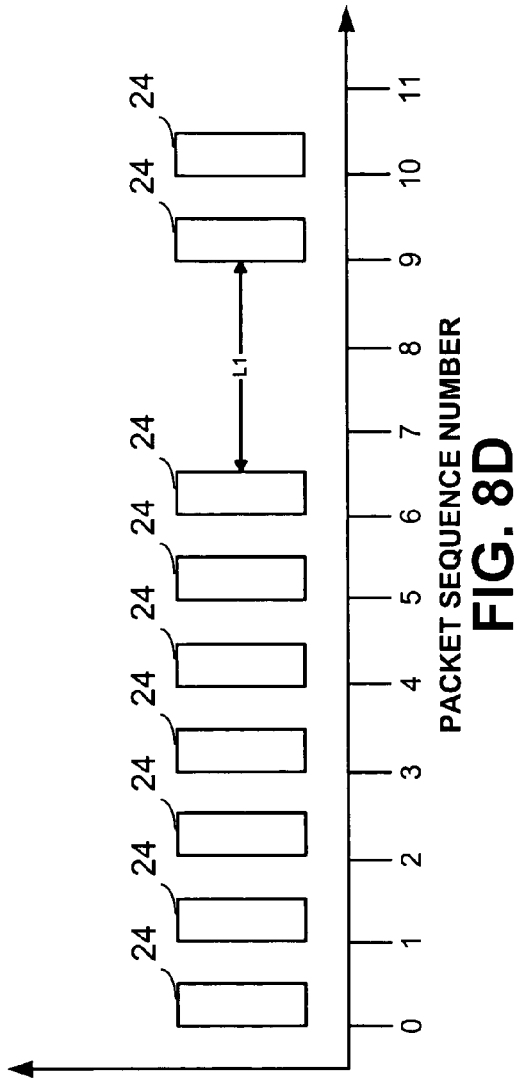

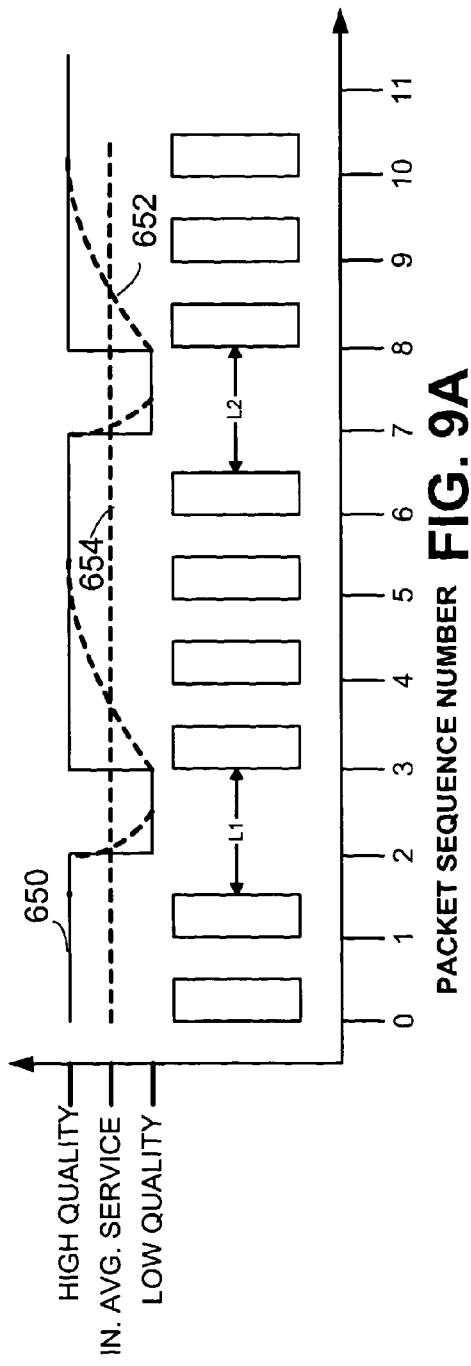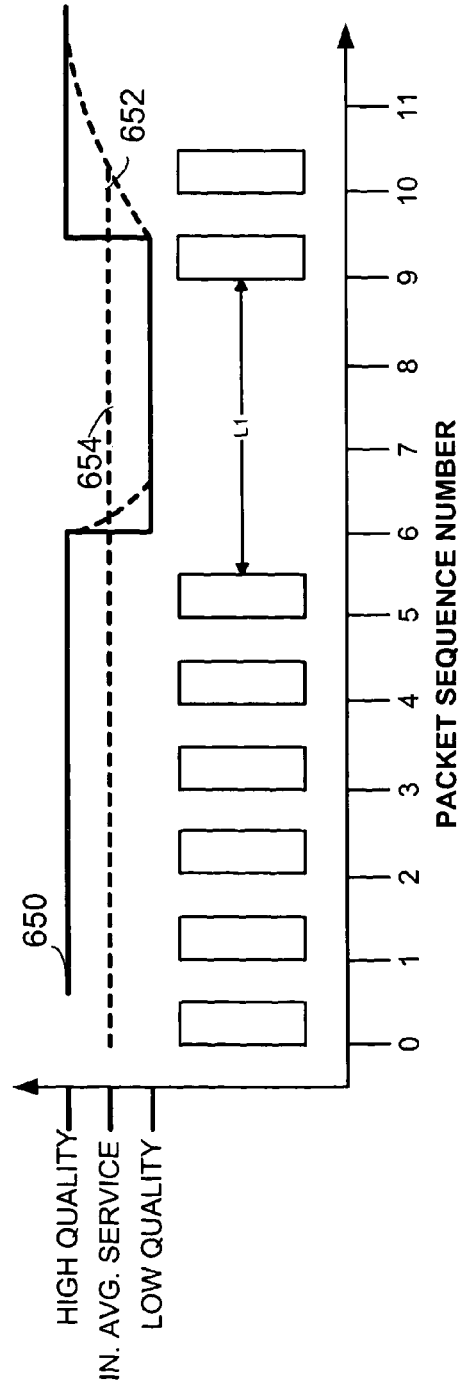

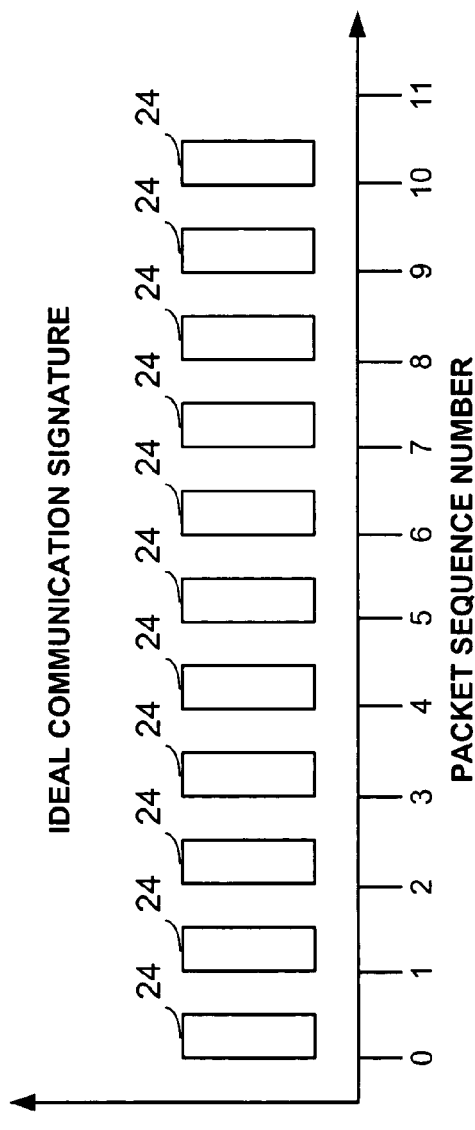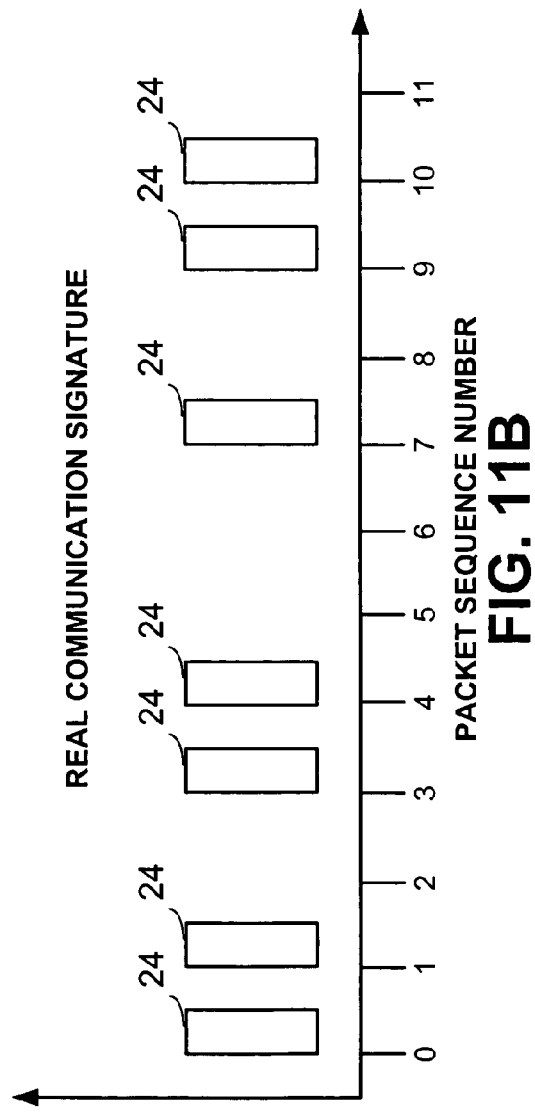

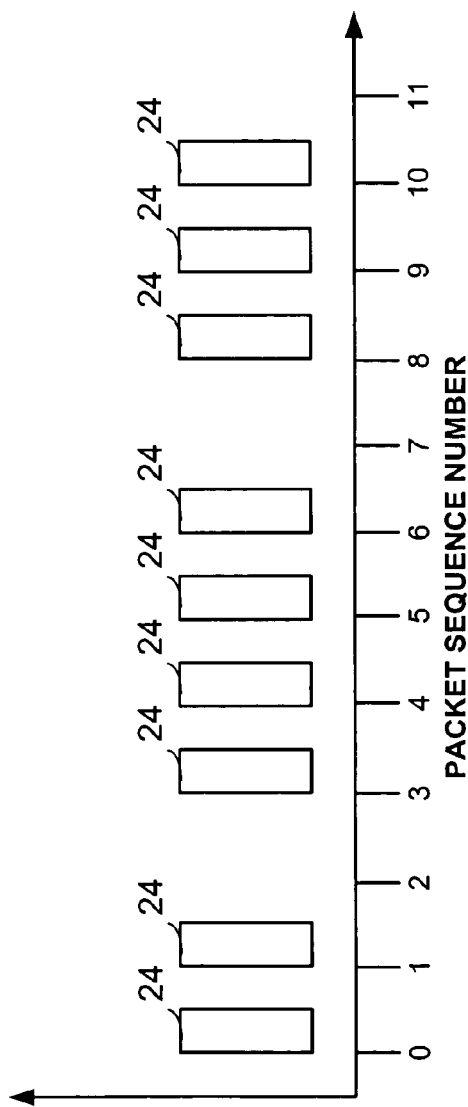
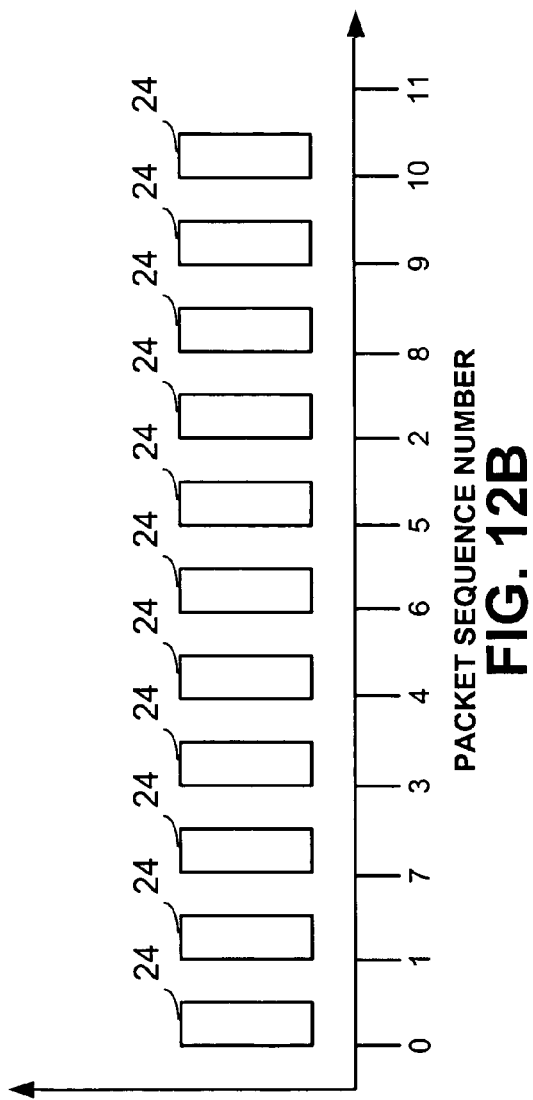

US 8,094,629 B2

WIRELESS LOCAL AREA NETWORK REAL-TIME QUALITY MANAGEMENT

RELATED APPLICATIONS

This application claims priority of U.S. Provisional Application No. 60/472,647 filed May 22, 2003 entitled, "Method for Handoff of a Telephone Call between Two Different Wireless Networks" by Rick Bye, and is incorporated herein by reference in its entirety.

TECHNICAL FIELD OF THE INVENTION

The present invention relates generally to communication networks supporting multimedia packetized communications, and more particularly to a system for managing the quality of service provided by a wireless local area network.

BACKGROUND OF THE INVENTION

Communication technologies that network electronic devices are well known. Examples include wired packet data networks, wireless packet data networks, wired telephone networks, and satellite communication networks, among other networks. These communication networks typically include a network infrastructure that services a plurality of client devices. The Public Switched Telephone Network (PSTN) is probably the best-known communication network and has been in existence for many years. The Internet, another well-known example of a communication network, has also been in existence for a number of years. Communication networks like these enable client devices to communicate with one another on a global basis.

Local Area Networks (wired LANs), e.g., Ethernets, support communications between networked computers and other devices within a serviced area. These wired LANs often link serviced devices to Wide Area Networks and the Internet. Each of these networks is generally considered a "wired" network, even though some of these networks, e.g., the PSTN, may include some transmission paths that are serviced by wireless links.

Wireless networks have come into existence more recently. Examples include cellular telephone networks, wireless LANs (WLANs), and satellite communication networks. Common forms of WLANs such as IEEE 802.11(a) networks, IEEE 802.11(b) networks, and IEEE 802.11(g) networks are referred to jointly as "IEEE 802.11 networks." In a typical IEEE 802.11 network, a wired backbone couples to a plurality of Wireless Access Points (APs), each of which supports wireless communications with computers and other wireless terminals that include compatible wireless interfaces within a serviced area. The wired backbone couples the APs of the IEEE 802.11 network to other networks, both wired and wireless, and allows serviced wireless terminals to communicate with devices external to the IEEE 802.11 network. Devices that operate consistently with an IEEE 802.11 protocol may also support adhoc networking in which wireless terminals communicates directly to one another without the presence of an AP.

Currently, Wireless Local Area Networks (WLANs) service a wide variety of data communications, typically relating to non real-time requirements. As the bandwidth supported on the wireless links serviced by the WLANs increases, additional data communications may also be supported, e.g., Voice Over Internet Protocol (VOIP), video conferencing, multi-media streaming, etc. However, when the WLAN supports many data transactions, the communications requiring continual throughput such as voice and multimedia communications may not be sufficiently serviced. The result of this shortcoming is reduced voice and video image quality, disconnection of the serviced communication, etc.

The shortcomings of the WLAN may be at the APs that service the wireless links within the WLAN. Each WLAN supports only a maximum throughput, e.g., 11 MBPS for IEEE 802.11b APs and 54 MBPS for 802.11a and 802.11g APs. When a particular AP cannot service all of its client devices, latency in the communications will increase. Because the AP cannot typically assign priority to its serviced communications, some or all of the serviced communications are adversely affected.

The performance of the WLAN may also be affected by the switches, routers, nodes or other elements in the backbone network of the WLAN and/or gateways that couple the WLAN to a Wide Area Network (WAN), to the Internet, to the Public Switched Telephone Network (PSTN) or to another servicing network. When these devices become overloaded, the WLAN serviced communications are also affected. Additionally, traffic within individual network segments may adversely impact communications.

WLANs often serve as terminating networks for voice communications, multimedia communications, etc. In some operations, the WLANs perform adequately but a network that couples the WLANs does not. An example of such an installation is when two offices of a major corporation each have WLAN service and a WAN couples the WLANs. In order to reduce telephony costs, voice traffic is routed across the WAN. When voice quality suffers, the WLAN administrators most likely identify the WLAN components as the problem even though the WAN itself may be the bottleneck. This troubleshooting most often occurs when reported by a user after the fact. By that time, the WAN problem may have been remedied and the system administrator can offer no solution. Such is also the case when the APs or other WLAN components are temporarily overloaded.

Thus, a need exists for intelligent systems and components that can identify network or pathway problems in real-time and effect real-time solutions. These solutions may involve dynamically altering coding schemes, network pathways or dynamically assigning priorities to network communications.

SUMMARY OF THE INVENTION

This disclosure provides a system and method by which any real-time audio and/or visual communications that are negatively impacted by packet delay or packet losses, such as Voice over Internet Protocol (VoIP) or wireless terminals that transmit and receive communications in digital form having discrete packets may be provided. More specifically, a first embodiments involves a Wireless Local Area Network (WLAN) terminal with a wireless interface to exchange packetized communications with a servicing Access Point (AP) within the WLAN. An internal processing unit communicatively couples to the wireless interface. This processing unit also operably couples to and directs a programmable COder/DECoder (CODEC) to convert incoming packetized communications (received from the WLAN) to incoming user communications, and to convert outgoing user communications into packetized communications according to a selected coding scheme. A user interface communicatively coupled to the programmable CODEC receives the incoming user communications and provides these communications to the user. The interface also receives input from the user with which to produce outgoing user communications. The processing unit monitors the serviced packetized communications to determine a communication quality level supported by the wireless interface and chooses a coding scheme from a number of supported coding schemes based upon the delivered communication quality level. This communication quality level depends on the jitter experienced by the communications, the number and frequency of lost packets, the arrival or transmission rate of the packetized communications, and other such factors known to those skilled in the art.

Alternatively, a second embodiment provides a wired terminal, such as a VoIP telephone, that exchange packetized communications with a servicing network. An internal processing unit communicatively couples to a network interface. This processing unit also operably couples to and directs a programmable COder/DECoder (CODEC) to convert incoming packetized communications (received from the network) to incoming user communications, and to convert outgoing user communications into packetized communications according to a selected coding scheme. A user interface communicatively coupled to the programmable CODEC receives the incoming user communications and provides these communications to the user. The user interface also receives input from the user with which to produce outgoing user communications. The processing unit monitors the serviced packetized communications to determine the communication quality level delivered by the wireless interface and chooses a coding scheme from a number of supported coding schemes based upon the delivered communication quality level.

Alternatively the communications quality can be monitored within switches, routers, handsets, nodes, access points or other elements within the network infrastructure known to those skilled in the art. Monitoring the packetized communications from end-to-end supports the management of the coding scheme and routing of the packetized communications. For example, in one instance, the processor communicates with a far-end terminal to identify the selected coding scheme. These coding schemes may include, but are not limited to audio and/or video coding scheme such as Huffman encoding, ITU-T G.711, u-law, A-law, CCITT G.721, CCITT G.723, ITU-T G.726, ITU-T G.723.1, ITU-T G.723.1A, ITU-T G.729, ITU-T G.729A, ITU-T G.729AB, ITU-T G.729E, ITU-T G.728, ITU-T G.722, ITU-T G.722.1, ITU-T G.722.2, GSM-EFR, GSM AMR, IMA/DVI ADPCM, Microsoft ADPCM, LPC-10E, CELP GSM 06.10, shorten, Real Audio, MPEG, ACE and MACE.

In another instance, the jitter buffer, real or emulated, monitors latency and other parameters that may affect communications quality as known to those skilled in the art. This latency is then used to determine the delivered communication quality level.

Additionally, the WLAN terminal may monitor a number of APs and select the servicing AP based upon an expected service quality level. This may be accomplished by monitoring a number of APs. This may involve querying the APs to determine the service quality of each AP. The wireless terminal then registers with the AP that provides the best available service quality. Similarly, the terminal may select a new servicing AP when the service quality provided by the new servicing AP exceeds the current service by a predetermined service quality level.

This disclosure also teaches a method of servicing real-time communications to a WLAN terminal. This involves receiving incoming and outgoing user communications at a user interface of the WLAN terminal. The coding scheme, selected from a set of supported coding schemes, is employed by a programmable COder/DECoder (CODEC) to convert incoming user communications from packetized communications and outgoing user communications to packetized communications. These communications are exchanged between a servicing AP of the WLAN and the wireless terminal at a communication quality level. This communication quality level is monitored to determine the actual communication quality level delivered between the AP and WLAN (wireless) terminal. The selected coding scheme may be modified based upon the delivered communication quality level between the AP and WLAN terminal in order to maintain or achieve the desired communication quality level.

As the packetized communications are ultimately exchanged between the WLAN terminal and a far-end terminal, other embodiments monitor the delivered communication quality level between the WLAN terminal and the far-end terminal. This monitoring determines the communication quality level delivered between the WLAN terminal and the far-end terminal. The collected information allows a more favorable coding scheme to be selected from the available coding schemes supported by the WLAN terminal and the far-end terminal, and any known or identified network impediments.

In another instance, real or emulated jitter buffers may be used to monitor the latency and other parameters that may affect communications quality as known to those skilled in the art. This latency other parameters that may effect communications quality is used to determine the communication quality level between the AP and WLAN terminal or along any network segment. Additionally, the communication quality level supported between the WLAN terminal and the far-end terminal at any point in the network may also be determined.

This information may also be used to select the route the communications take by choosing which network segments are used to route the communications or which AP is servicing the communication. In the case of the later, the APs are queried to determine the expected service quality level from each AP. Then, the WLAN terminal registers with a new servicing AP when the expected service quality level to be provided by the new servicing AP exceeds the expected service quality level provided by the servicing AP by a predetermined service quality level.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 8C and 8D depict real communication signatures wherein packets of data are dropped;

FIGS. 9A and 9B illustrates the perceived and measured quality level impacts of the dropped packets in FIGS. 8C and 8D;

FIG. 11A provides an ideal communication signature wherein a real-time communication is received in packet sequence order;

FIG. 11B depicts a real communication signature wherein packetized communications are dropped via the wireless link between the wireless terminal and the access point;

FIG. 12A depicts a real communication signature wherein packetized communications are dropped within the network communication pathway;

FIG. 12B depicts a real communication signature wherein packets are received out of order from the network.

DETAILED DESCRIPTION OF THE INVENTION

Preferred embodiments of the present invention are illustrated in the figures, like numerals being used to refer to like and corresponding parts of the various drawings.

Figure 1A:
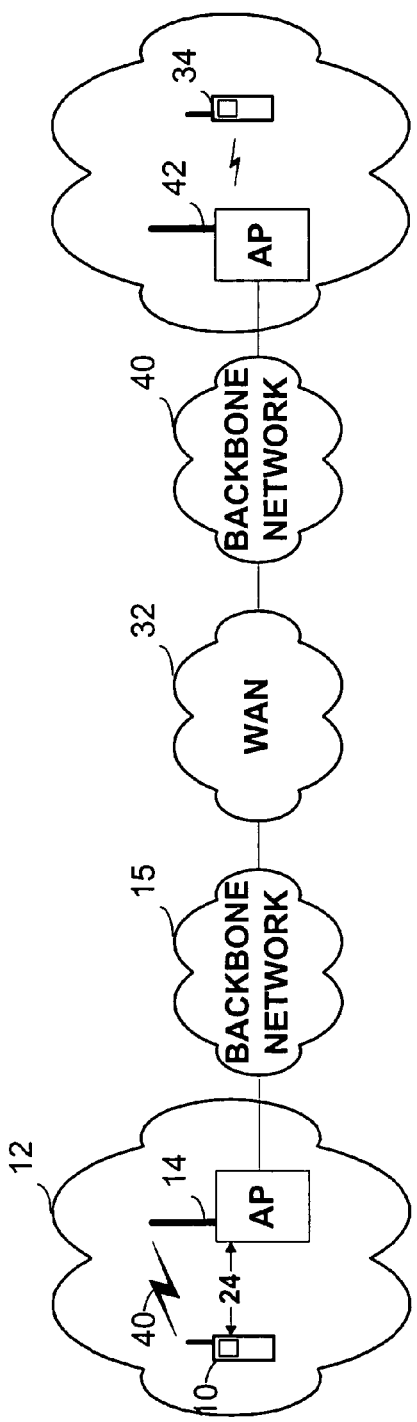
FIGS. 1A and 1B depict communication pathways between wireless terminals and far end terminals.
Figure 2:
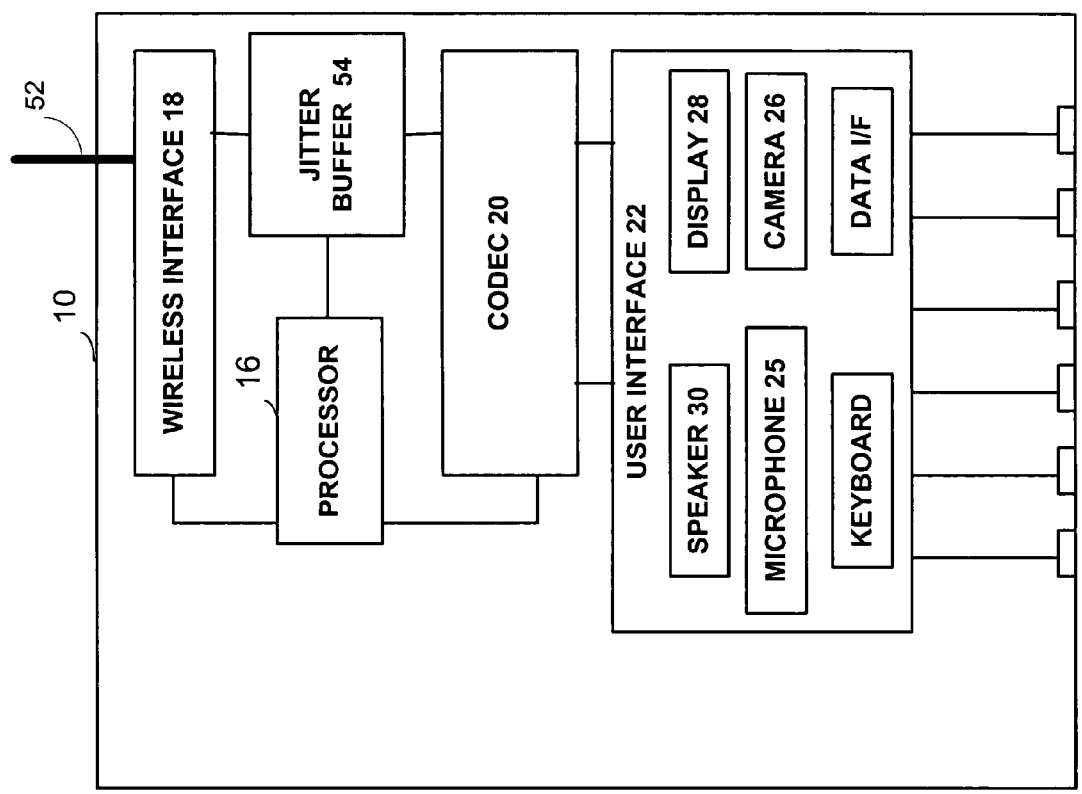
FIG. 2 provides a block diagram that details the functions of the wireless terminal of FIGS. 1A and 1B.

FIG. 1A provides a diagram illustrating a wireless terminal 10 wirelessly coupled to WLAN 12 through AP 14. FIG. 2 further details wireless terminal 10. Processing unit 16 within wireless terminal 10 couples to and directs the functions of wireless interface 18 that communicatively couples to AP 14. Additionally, processing unit 16 couples to and directs programmable COder/DECoder (CODEC) 20 to convert user information or communications received at user interface 22 into packetized communications. User interface 22 may take the form of a microphone 25, camera 26, or other like device to receive audio and/or visual input from a user. Additionally, the user interface 22 may include a display 28, speaker 30, or other like device to present audio and/or visual information to the user. Packetized communications 24 are exchanged between wireless terminal 10 and AP 14.

Figure 1B:
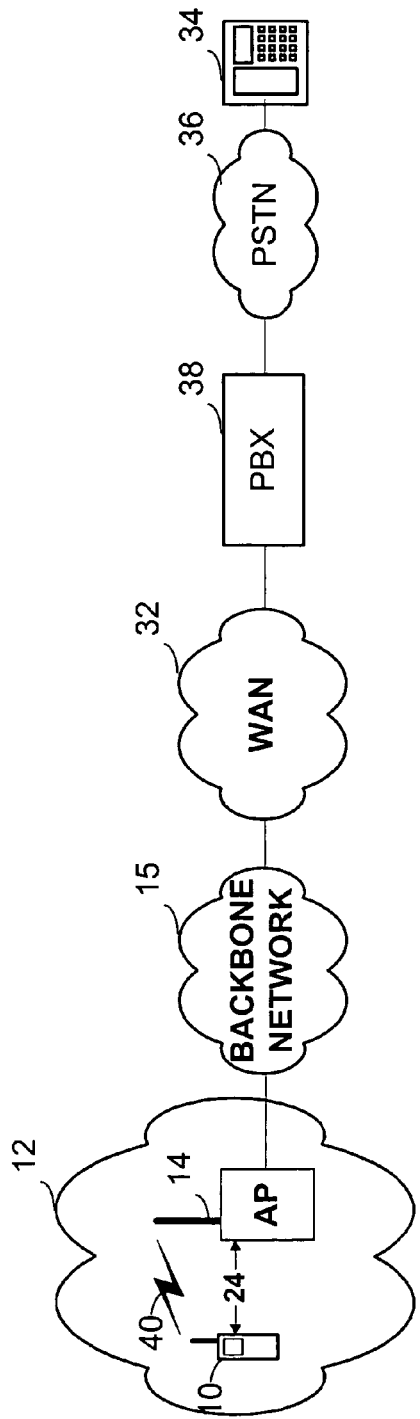

As shown in FIG. 1A, AP 14 broadcasts within WLAN 12 and couples to backbone network 15. As shown, backbone network 15 couples to a wide area network (WAN) 32 that in turn relays the packetized communications to far-end terminal 34. In this first instance, far-end terminal 34 is serviced by a remote wireless local area backbone network 40 having AP 42. It should be noted that the far-end terminal 34 need not be limited to a wireless terminal. For example, a wire-based telephone such as that illustrated in FIG. 1B may act as the far-end terminal. In this example, backbone network 15 couples to the public switch telephone network (PSTN) 36 via a private box exchange (PBX) 38 and delivers audio communications to a far-end terminal 34.

Returning to wireless terminal 10 of FIG. 2, processing unit 16 monitors the packetized communications 24 exchanged between wireless terminal 10 and AP 14 in order to determine a communication quality level delivered by the wireless link that couples wireless terminal 10 to AP 14. Once the communication quality level delivered by wireless link 40 has been determined, processing unit 16 specifies the coding scheme to be employed by CODEC 20 to convert user communications into packetized communications 24 at the specified communication quality level. Additionally, processing unit 16 may communicate with far-end terminal 34 to determine the overall delivered communication quality level along the entire communication pathway. Then processing unit 16 can select the coding scheme based on the overall required or desired communication quality level.

Some example coding schemes used in audio or video coding include Huffman encoding, ITU-T G.711, u-law, A-law, CCITT G.721, CCITT G.723, ITU-T G.726, ITU-T G.723.1, ITU-T G.723.1A, ITU-T G.729, ITU-T G.729A, ITU-T G.729AB, ITU-T G.729E, ITU-T G.728, ITU-T G.722, ITU-T G.722.1, ITU-T G.722.2, GSM-EFR, GSM AMR, IMA/DVI ADPCM, Microsoft ADPCM, LPC-10E, CELP GSM 06.10, shorten, Real Audio, MPEG, ACE and MACE, as well as others known to those skilled in the art.

Wireless terminal 10 receives packetized communications 24 wirelessly via antenna 52. Wireless interface 18 exchanges the incoming communications with jitter buffer 54. Processing unit 16 monitors jitter buffer 54 to determine its latency. This information may be used to determine the communication quality level delivered by wireless link 40. Based on the measurement of the communication quality level delivered, processing unit 16 may change the selected coding scheme used by CODEC 20 to convert user communications received to and from packetized communications.

Figure 3:
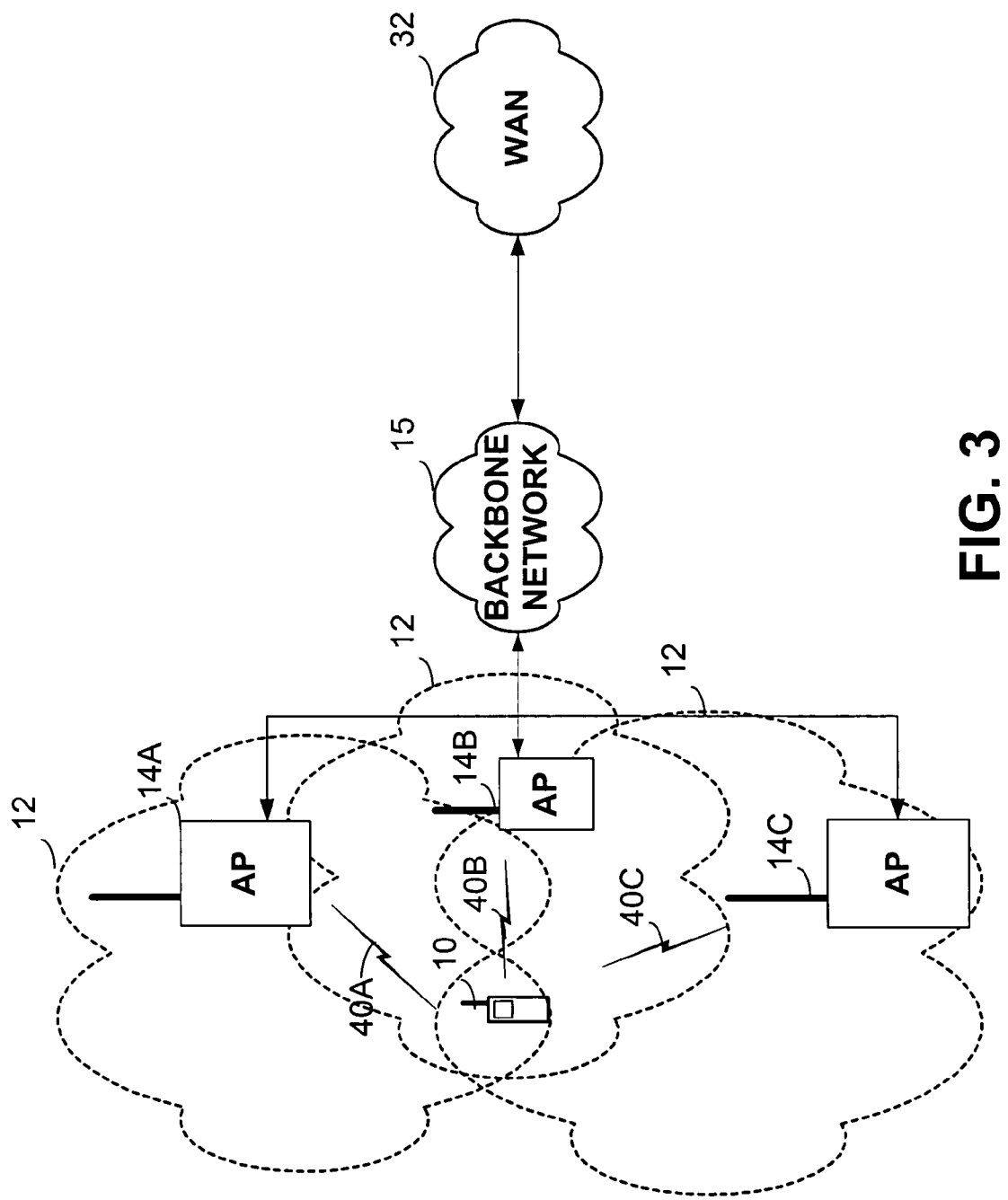
FIG. 3 depicts an embodiment where an individual wireless terminal selects a communication pathway, selects a wireless link to an access point providing the highest level of service.

Processing unit 16 may also monitor various signal pathways in its decision-making process. FIG. 3 depicts a situation wherein wireless terminal 10 has access to APs 14A, 14B and 14C that each couple to wireless local area backbone network 15. This allows processing unit 16 to choose its servicing AP based upon the expected service quality level supplied by individual APs 14A, 14B and 14C. In one instance, this process involves monitoring a number of APs by querying each available AP to determine the service quality level delivered by each individual AP. Wireless terminal 10 then chooses a new AP when the service quality level provided by the new servicing AP exceeds the service level provided by the current servicing AP by a predetermined service level.

Figure 4A:
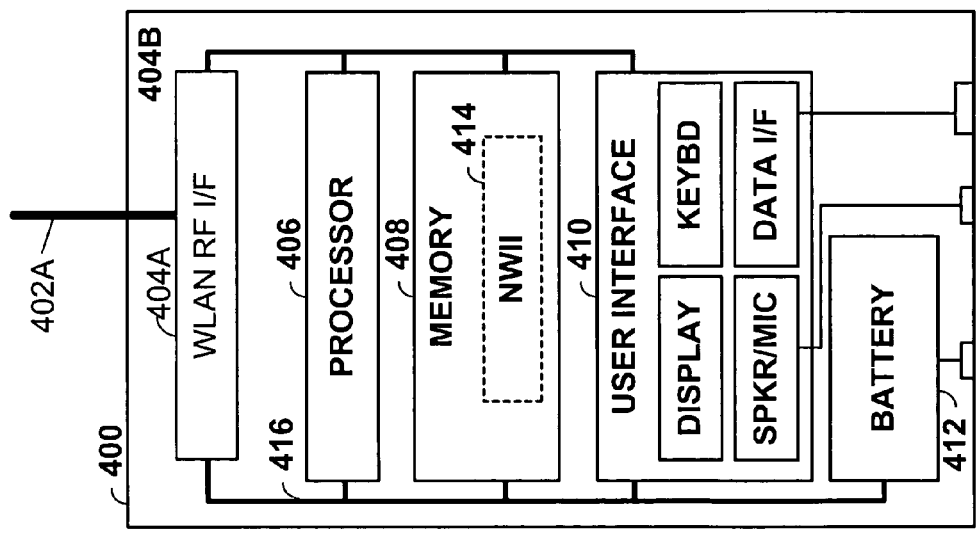
FIGS. 4A-4D provide block diagrams depicting the functions of various embodiments of wireless terminals.
Figure 4B:
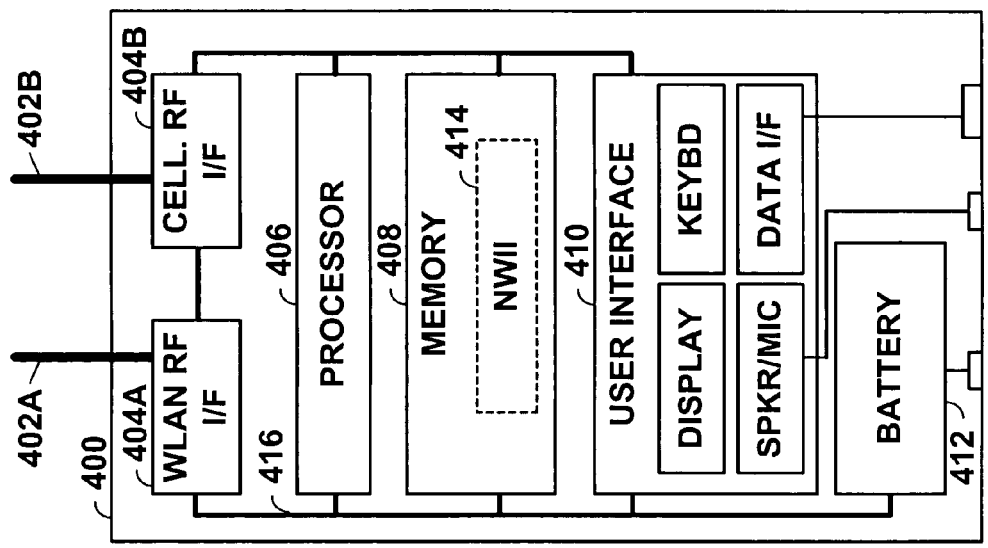
Figure 4C:
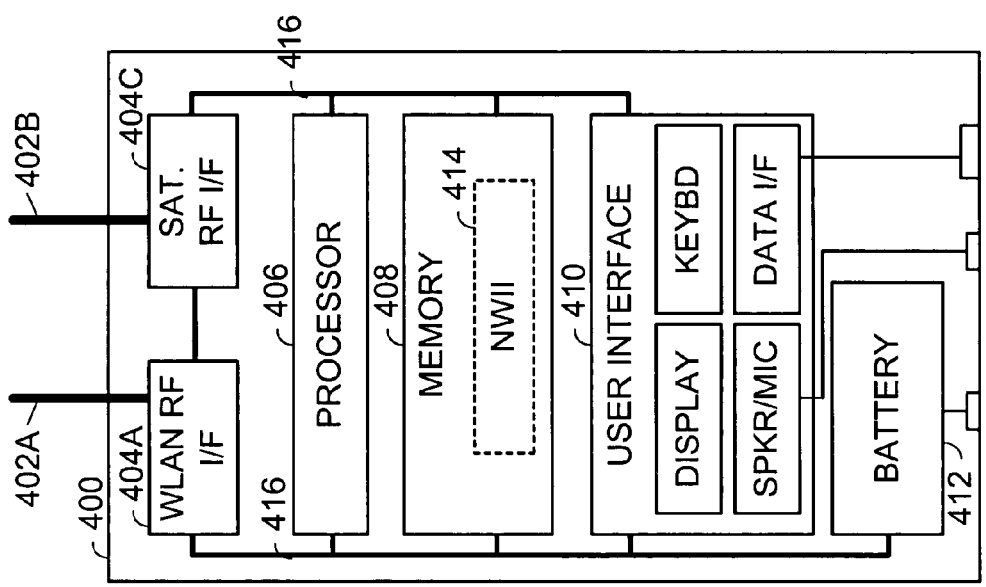
Figure 4D:
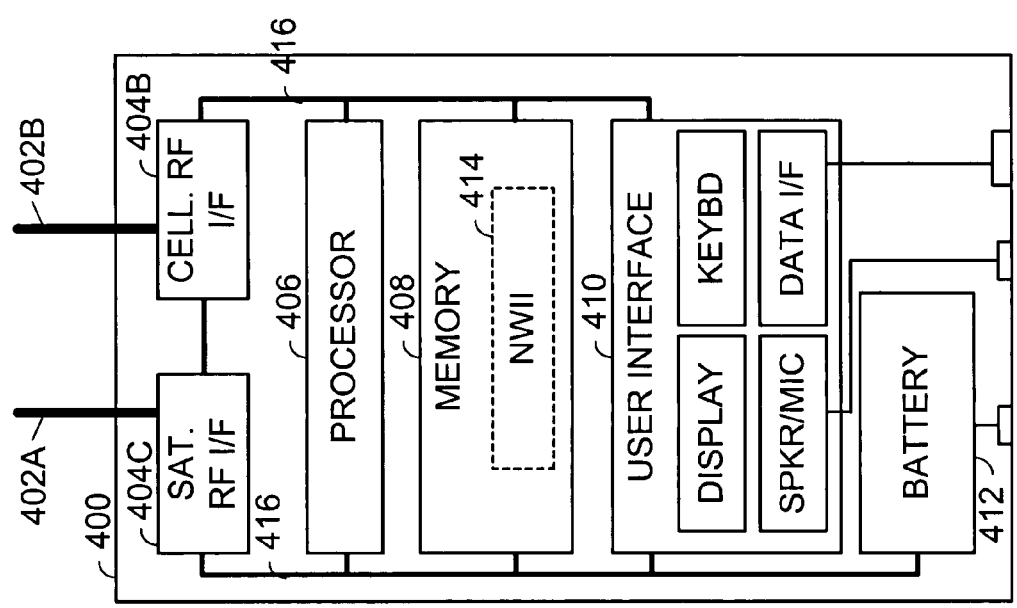

FIGS. 4A-4D provide block diagrams illustrating the typical components of various wireless terminals. FIG. 4A depicts wireless terminal 400 as having only a short-range digital radio WLAN RF unit 404A that supports Bluetooth® or like wireless communications with the WLAN. FIG. 4B includes a cellular RF unit 404B that supports wireless communications with the cellular network. FIG. 4C includes a WLAN RF unit 404A and satellite RF unit 404C. FIG. 4D includes WLAN RF unit 404A, cellular RF unit 404B, and satellite RF unit 404C. RF units, 404A, 404B and 404C couple to antennas 402A, 402B and 402C respectively. These antennas 402A, 402B, and 402C may be located internal or external to the case of the wireless terminal 400. Further, in some embodiments, a single RF unit and/or a single antenna may support communications with both the WLAN and the cellular network. Processor 406 may be an Application Specific Integrated Circuit (ASIC) or another type of processor capable of operating the wireless terminal 400 according to this disclosure. Memory 408 includes both static and dynamic components, e.g., DRAM, SRAM, ROM, EEPROM, etc. In some embodiments, the memory 408 may be partially or fully contained upon an ASIC that also includes the processor 406. A user interface 410 includes a display, indicators, a keyboard, a speaker, a microphone, and/or a data interface, and may include other user interface components known to those still in the art. RF interfaces 404A, 404B, and 404C, processor 406, memory 408, and user interface 410 couple via one or more communication buses/links 416. Battery 412 or power port 418 couples to and powers RF interfaces, processor, memory and the user interface.

Figure 5A:
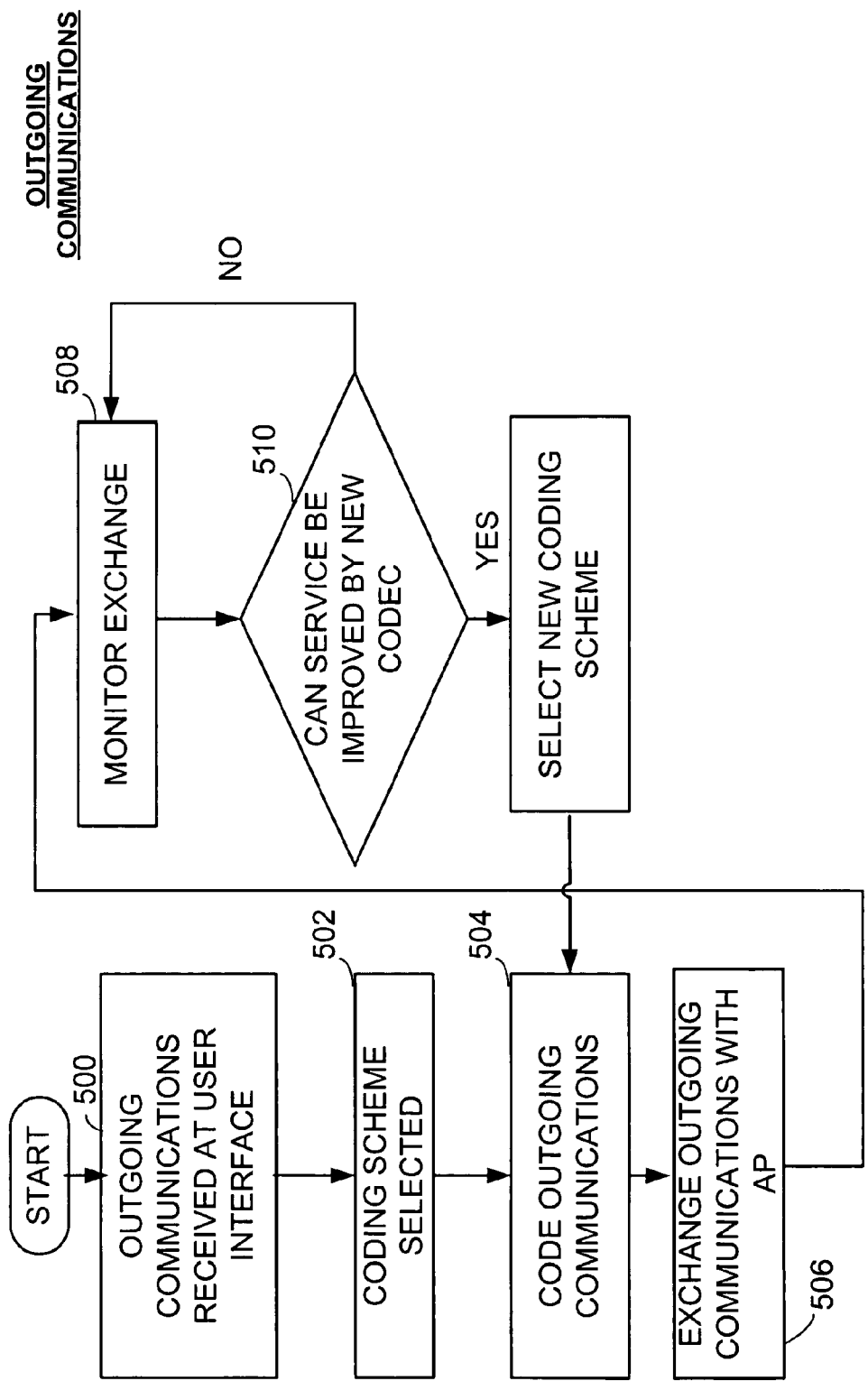
FIG. 5A depicts a flow chart detailing the processes associated with selecting the appropriate coding scheme for outgoing user communications.
Figure 5B:
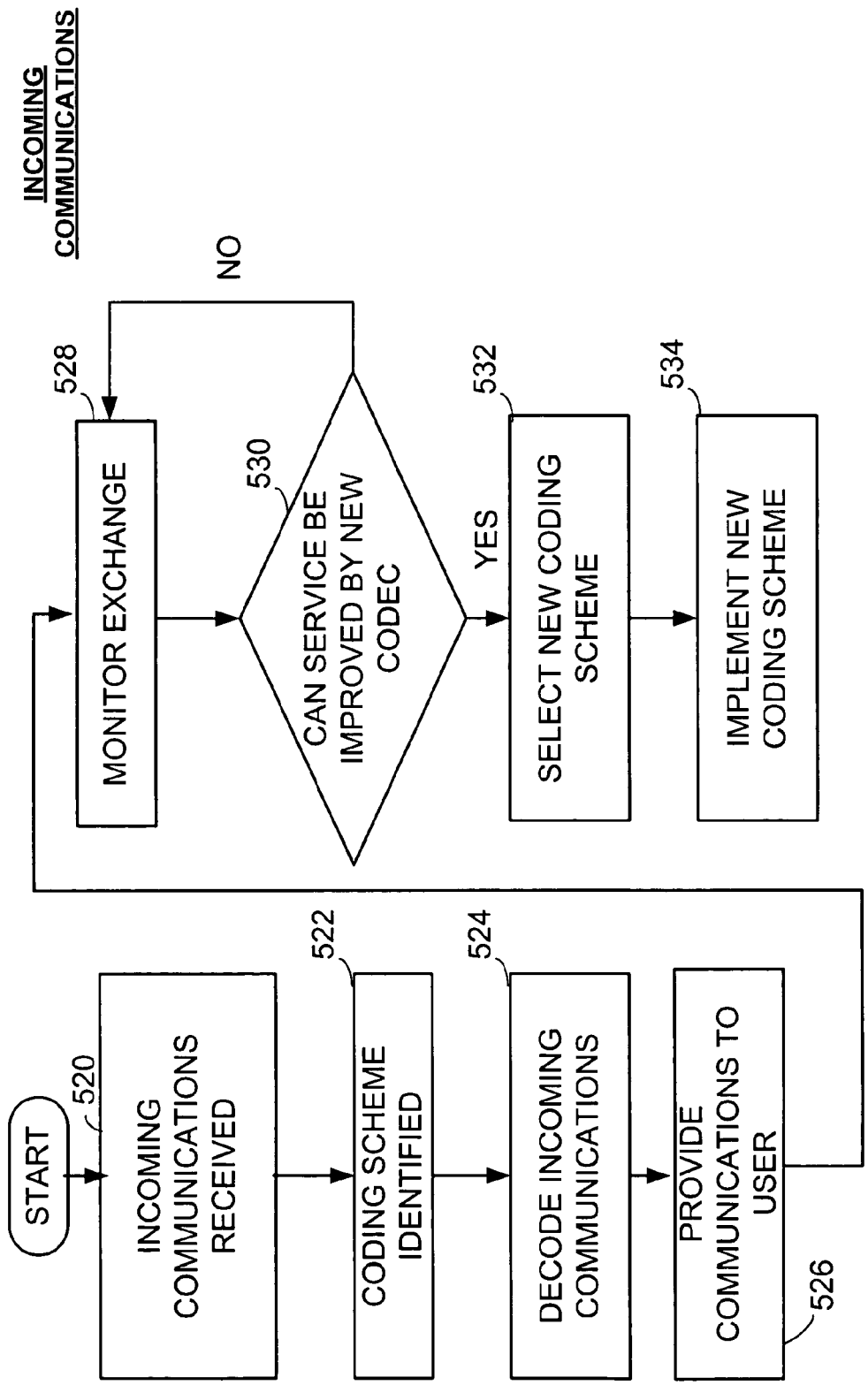
FIG. 5B depicts the selection of a coding scheme associated with incoming communications at the wireless terminal.

FIG. 5A provides a flowchart that depicts the servicing of real-time communications through a wireless terminal. At Step 500, outgoing communications are received at the user interface of the wireless terminal. These user communications may take the form of either audio or visual communications. An initial coding scheme, selected at Step 502, is utilized to code outgoing communications into packetized communications at step 504. FIG. 5B depicts incoming communications and utilizes the coding scheme to convert the incoming packetized communications to a format more readily used by the user. Outgoing packetized communications are exchanged between the wireless terminal and servicing AP at a given packetized rate in Step 506. This exchange is monitored in Step 508 to determine the communication quality level delivered between the AP and the wireless terminal. By monitoring the exchange of packetized communications between the AP and the wireless terminal, the maximum supported communication quality level delivered between the AP and the wireless terminal may then be used at decision point 510 to determine if the measured or perceived service can be improved by selecting a new coding scheme. If an improvement can be effected, a new CODEC is selected at step 512 and used in step 504 to convert new user communications into packetized communications. Otherwise, the processor continues to monitor the exchange of packetized communications in step 508.

FIG. 5B provides a flow chart illustrating the processes associated with receiving incoming packetized communications at the wireless terminal via the AP. At step 520, incoming packetized communications from the network are received at the wireless terminal. The processor identifies the coding scheme associated with these packetized communications in step 522. These communications are converted into user communications at step 524 and provided to the user through an interface at step 526. Simultaneously, the device monitors the communication quality level between the wireless terminal and the AP, and potentially the far-end terminal in step 528.

During the monitoring, a continuous evaluation is made as to whether or not the measured or perceived service can be improved with an alternative coding scheme at decision point 530. If it cannot, monitoring continues at step 528. Otherwise, a new coding scheme is selected in step 532, and implemented with the far-end terminal in step 534. New communications received should then be coded in accordance with the selected coding scheme as the process begins again at step 520.

Figure 5C:
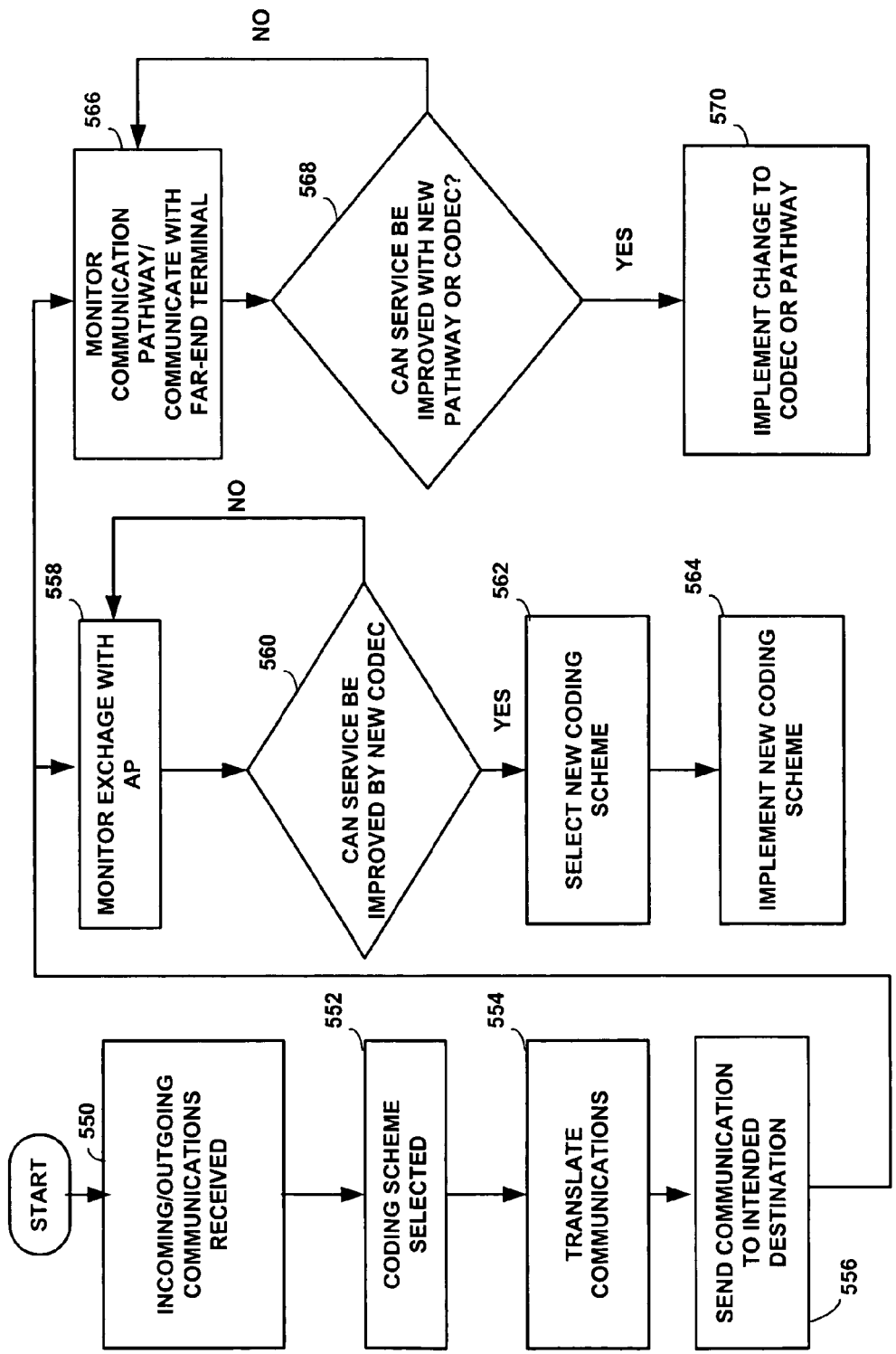
FIG. 5C depicts a process by which ingoing and outgoing communications are received and the coding scheme and communication pathway are monitored and evaluated for potential changes which would improve the measured and perceived quality of the serviced communication.

FIG. 5C illustrates the receipt of incoming and outgoing communications at a user interface in step 550. An initial coding scheme, selected at step 552, is employed in step 554 to translate between user communications and packetized communications. Packetized communications are exchanged between the wireless terminal and the APs at step 556. As previously stated, the exchange process is monitored to determine the delivered communication quality level between the wireless terminal and APs in step 558. At decision point 560, a determination is made as to whether or not a need exists to revise the CODEC. The revised CODEC is selected and implemented in steps 562 and 564 respectively. Otherwise, the processor continues to monitor the exchange of packetized communications.

The monitoring process may also evaluate the communication pathways used to exchange packetized communications between the wireless terminal and the far-end terminal in step 566. Alternatively, communications between both end points may determine the appropriate CODEC or communication pathway. The process answers this question at decision point 568 and implements changes at step 570 or continues to evaluate at step 566.

In this embodiment, the overall communication quality level delivered across the entire communication path maybe evaluated. The decision to revise the selected CODEC at the above decision points now may consider the overall communication quality level and/or network/hardware considerations. Additionally, communications between the wireless terminal and the far-end terminal may identify a CODEC supported by both the far-end terminal and wireless terminal.

The process of monitoring packetized communications between end points may include monitoring the latency of packetized communications within the jitter buffer within the wireless terminal. As will be discussed later, this process may also be repeated or emulated at the AP or various nodes within the communication pathways that link the wireless terminal to the far-end terminal.

Figure 6A:
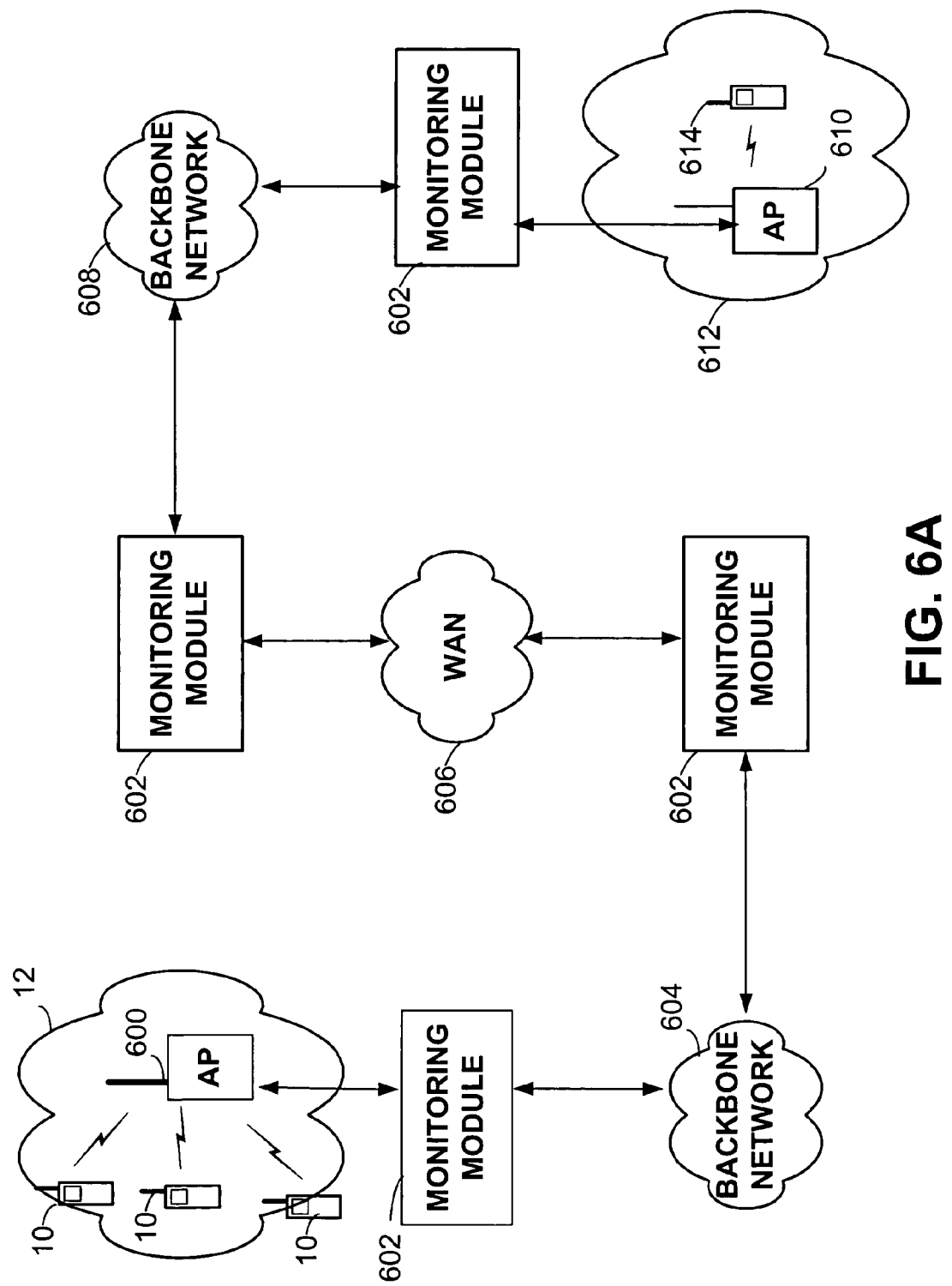
FIGS. 6A and 6B depict an embodiment wherein the decision making process may be executed by a processor within either an access point or a quality monitoring module.
Figure 6B:
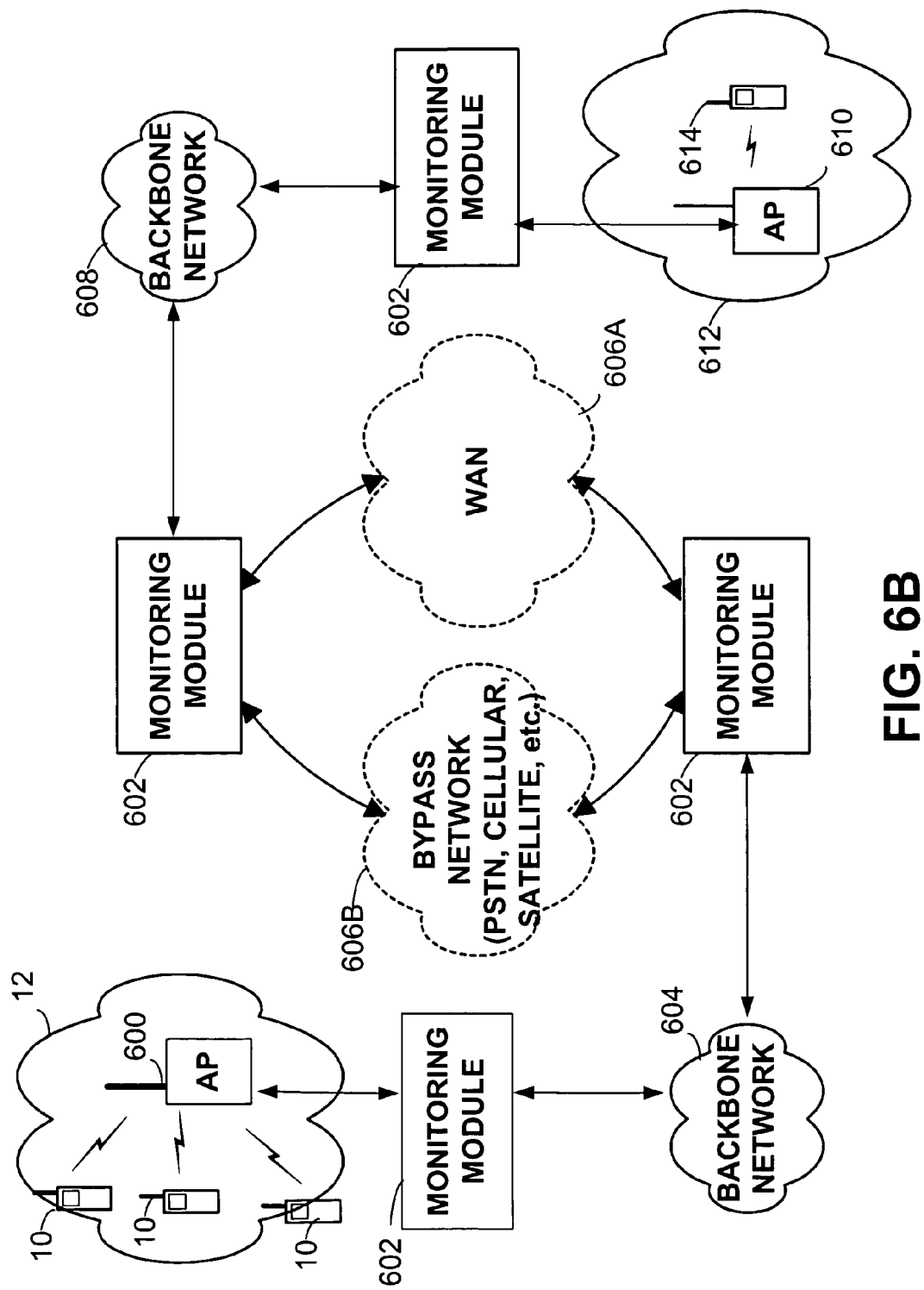

FIGS. 6A and 6B detail embodiments where the processing and decision-making process does not need to occur within wireless terminal 10. Here, wireless terminal 10 is wirelessly linked to AP 600. AP 600 services WLAN 12. One embodiment of AP 600 is further detailed in FIG. 7A.

Figure 7A:
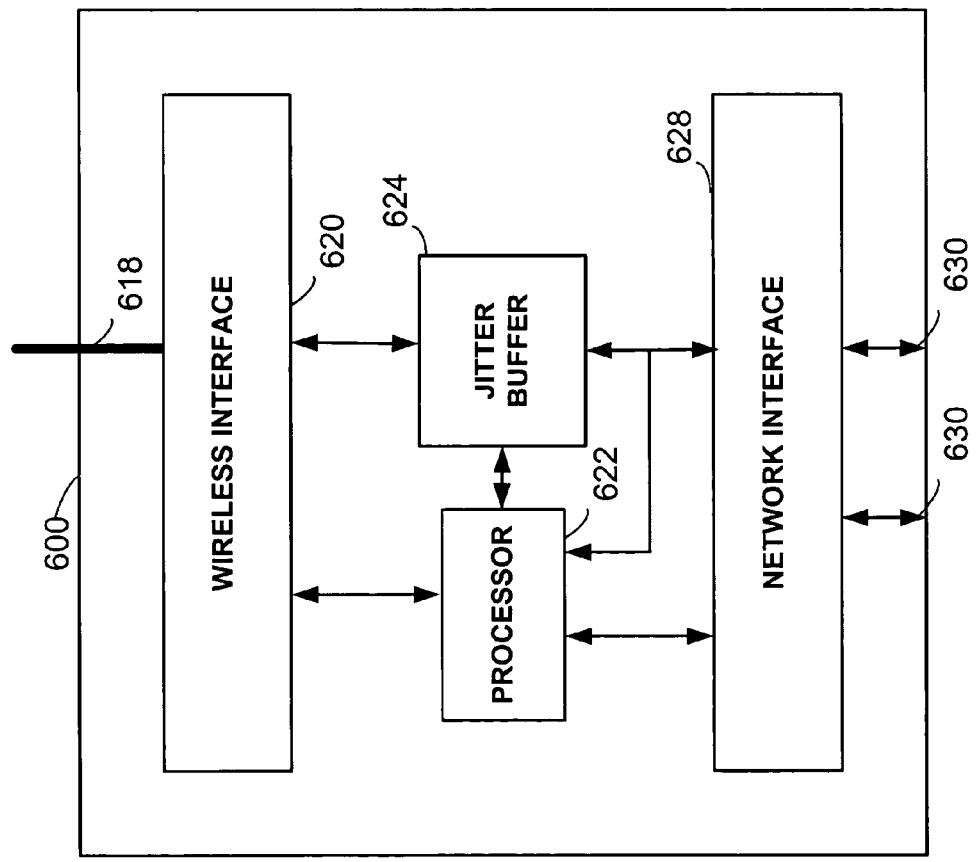
FIG. 7A depicts the internal functions of a wireless AP having the ability to monitor and make quality decisions on the exchange of packetized communications through the wireless AP.

In FIG. 7A, a wireless connection links wireless terminal 10 to antenna 618 and wireless interface 620 of AP 600. Processor 622 monitors and directs wireless interface 620, jitter buffer 624, and network interface 628. Processor 622 identifies and examines the communication signatures of packetized communication from wireless terminal 10 to determine if the communication is a real-time communication or non-real-time communication. A priority based on the communications real-time requirements is assigned for the serviced communication. Additionally, processor 622 evaluates the coding scheme and communication pathways used between wireless terminal 10 and the intended far-end terminal. Processor 622 determines how the communication should be routed and assigns a coding scheme and communication pathway that provides a predetermined level of service for the real-time communication. Furthermore, processor 622 may communicate with wireless terminal 10 in order to direct which coding scheme is to be used by the programmable CODEC, with the terminals.

In one example, processor 622 may examine the packetized communications exchanged between wireless terminal 10 and wireless interface 620 to determine the communication quality level delivered by the wireless link. When the wireless link is limiting, processor 622 may employ a coding scheme based on the communication quality level delivered by the wireless link. Additionally, by examining the jitter buffer 624, processor 622 determines the latency associated with these buffers and assigns an appropriate coding scheme based on that latency. Processor 622 also interfaces with network interface 628 to direct the exchange of packetized communications between AP 600 and the backbone network or other network components in the communication pathway between wireless terminal 10 and the destination terminal.

Figure 7B:
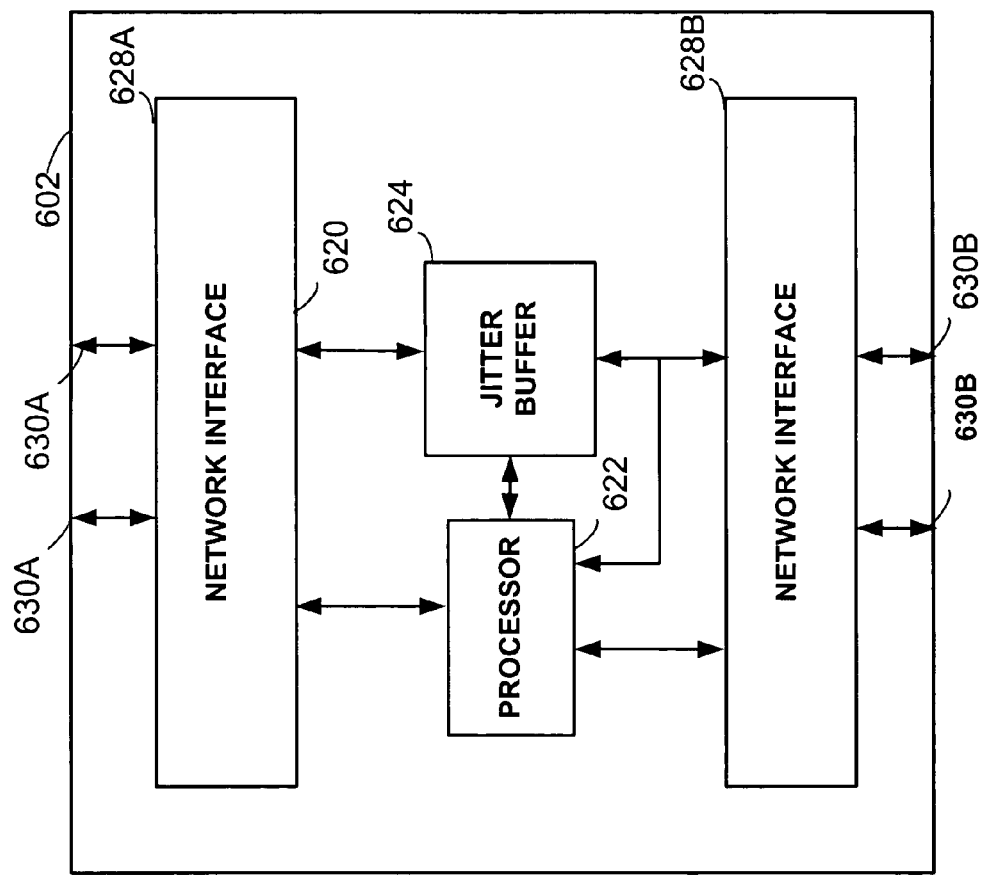
FIG. 7B depicts a quality-monitoring module located within the network. The module is capable of monitoring, evaluating and acting on information contained within the communication signatures of packetized communications passing through the quality monitoring module.

These same processing functions may be achieved with a quality-monitoring module 602 further detailed in FIG. 7B. If the WLAN AP that the wireless terminal communicates with does not have the ability to monitor and evaluate packetized communications, these functions may be achieved by quality monitoring module 602. Additionally, these modules, when located at nodes within the pathway, may supplement the functions of APs having these abilities.

FIG. 7B shows that network communications maybe received at network interface 628A via port 630A. As previously stated, the network interface couples to processor 622, jitter buffer 624. The communications then pass from network interface 628B and ports 630B to the other segments in the network.

Returning to FIG. 6A, it should be further noted that quality-monitoring modules 602 might be located within any network segment or at any network vertices such as those between backbone network 604 and WAN 606, as well as backbone network 608 and WAN 606. FIG. 6A shows that wireless terminal 10 communicates with far-end terminal 614 along the communication pathway shown. It should be understood that the monitoring modules are optional as AP 600, as configured in FIG. 7A, has the ability to process and evaluate the packetized communications exchanged between the network and wireless terminal 10.

FIG. 6B includes a bypass network such as PSTN, cellular, satellite, or other like network known to those skilled in the art. In this instance, quality-monitoring modules 602 may direct that if the primary communication pathways are unable to support the real-time communications between wireless terminal 10 and far-end terminal 614, bypass network such as those identified above may be used in favor of WAN 606A. Quality monitoring modules 602, in addition to evaluating communication quality levels delivered by the network, and the coding schemes employed, may further direct that non-real-time communications receive a lower priority or be temporarily stored in a buffer, or be delayed to support real-time communications.

Figure 8A:
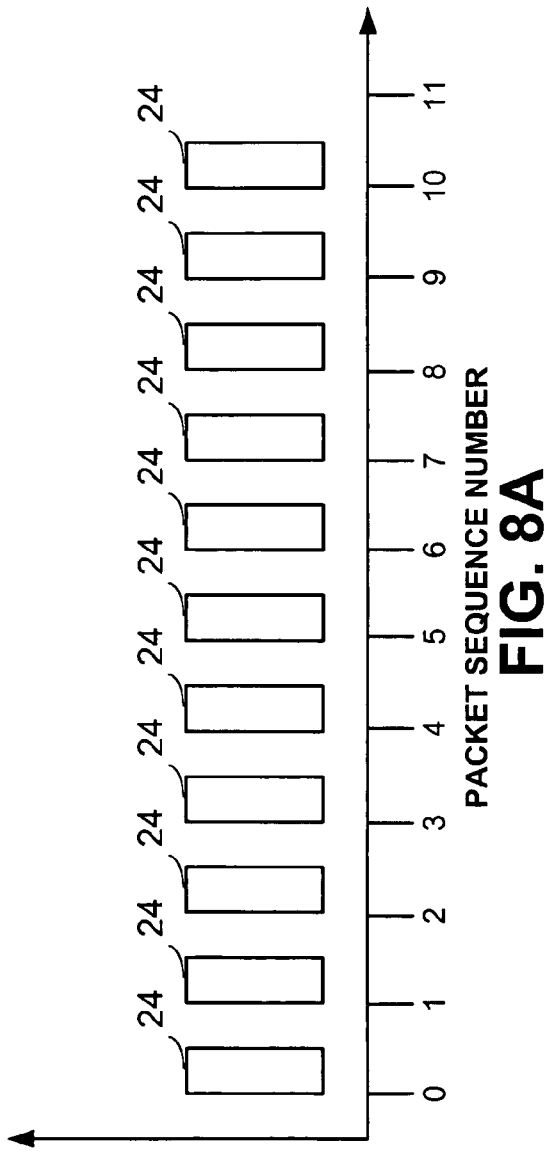
FIG. 8A provides an ideal communication signature of real-time packetized communications.
Figure 8B:
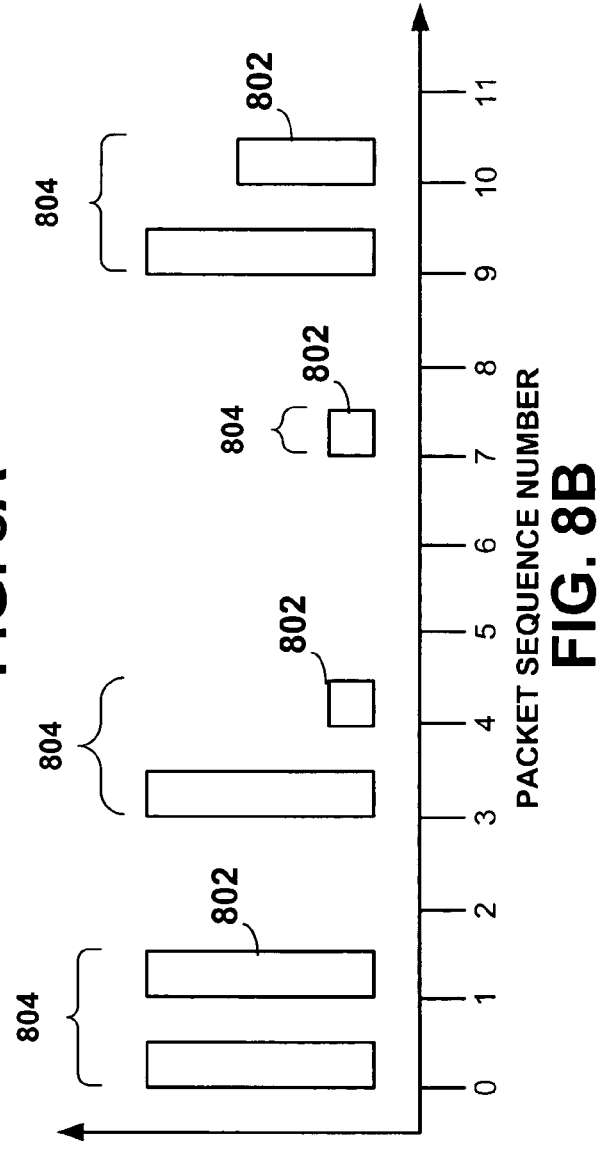
FIG. 8B provides one example of a non-real-time data communication involving bursts of data.

One process accomplished by processor 622 in either AP 600 or quality monitoring module 602 is to determine whether or not the communications received from wireless terminal 10 are above or below a predetermined communication quality level threshold. The determination as to whether or not the communications are real-time communications or non-real-time communications may be determined by the protocols associated with the communications. For example, RTP protocols may identify real-time communications. FIG. 8A provides an example of an ideal packetized communication signature associated with a real-time communication from the wireless terminal. FIG. 8B depicts one possible signature of data communications that contain large amounts of data in relatively small bursts 804. Thus, the processor may also evaluate these communication signatures to determine which communications are real-time communications and to assign a predetermined level of service to those real-time communications. This evaluation of the communication signature is important where non-real-time protocols are used to convey real-time communications.

FIGS. 8C and 8D show real-time communications with some data loss. Losses of individual packets of packetized communications impact the quality that the user perceives at the wireless terminal. It is important to maintain a perceived level of quality for the end user. This results in subscriber retention and increased user satisfaction. Ideally, VOIP systems should approach or exceed the quality of traditional telephony systems.

Figure 10:
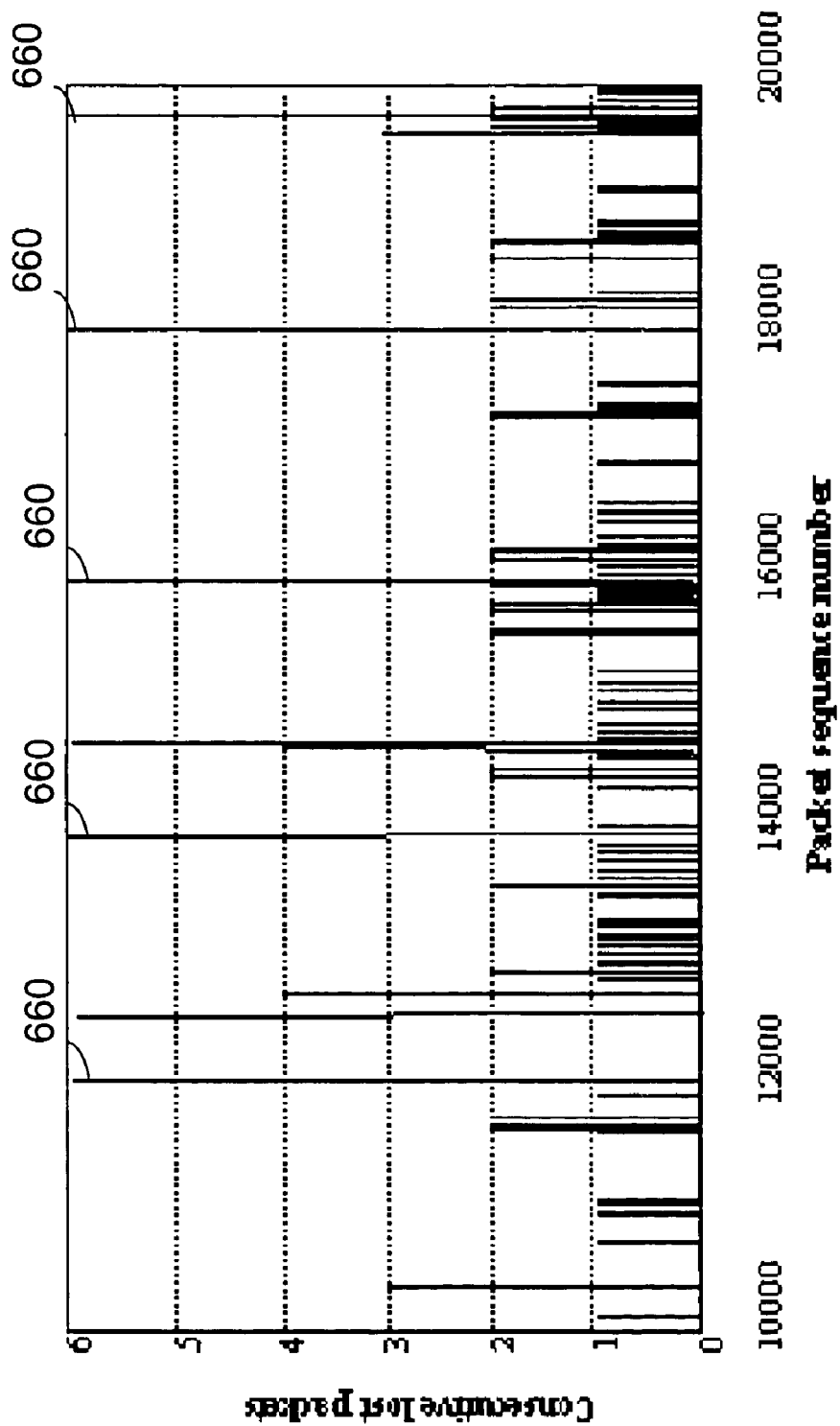
FIG. 10 depicts that packets are typically lost in bursts.

FIGS. 9A and 9B depict the effects of the dropped packets in FIG. 8C and 8D on the user's perceived quality. FIG. 9A shows that packet sequence 2 is lost as indicated by the gap L1. Gap L2 indicates the loss of packet sequence 7. These losses result in a reduced overall quality. Line 650 indicates the measured communication quality while dotted line 652 indicates the user's perceived communication quality. Line 650 depicts the measured communications quality as varying between a high quality and a low quality. Somewhere in between is a minimum average service to be maintained in order to ensure end user satisfaction. FIG. 9B depicts an instance when the same number of packetized communications is lost as in FIG. 9A but are lost consecutively. However the packets lost are consecutive or form a burst at gap L1. This loss has a much more pronounced effect on the user's perceived quality of the communications than the small non-burst losses seen in FIG. 9A. FIG. 9B depicts a large gap wherein the perceived quality 652 dropped below the minimum service level for the communications. The fact that lost packets typically occur in bursts is indicated by the data represented in FIG. 10 wherein consecutive lost packets versus packet sequence number are provided. Spikes 660 indicate large losses of data. These typically are large consecutive losses of packetized communications.

The time that it takes for the perceived quality of the communications to rise above a minimum acceptable level is a function of the recovery from the loss of data, and the coding scheme used. Some coding schemes may more quickly compensate for recently lost packets. FIG. 11A depicts an ideal communication signature between a wireless terminal and an AP wherein a real-time communication having a series of packetized communications 24 are received in the proper packet sequence order and contain approximately the same amount of information. In contrast, FIG. 11B depicts one example of a real communication signature between the wireless terminal and the AP wherein some packetized communications 24 are dropped in packet sequence order. Thus, the quality monitor for the signatures depicted in FIGS. 11A and 11B may choose different coding schemes. FIG. 11A does not require a rapid recovery from dropped packets. However, FIG. 11B requires the processors to select the scheme that provides the highest level of perceived quality and minimizes the effect of dropped packets. Additionally, the quality monitor may seek to service a wireless terminal with an alternative AP in order to avoid dropped packetized communications if a second AP is available to provide a higher level of service.

Network communications received from the far end terminal by the quality monitor should be received in packet sequence order and in a timely fashion. However, FIG. 12A provides the communication signature of packetized communications received from another segment in the network when packets are dropped. FIG. 12B depicts a communication signature wherein packets are received out of packet sequence order. Both instances may affect the perceived quality of the communication. However, the quality monitor may evaluate these communication signatures differently and direct different courses of action. For example, in FIG. 12A, where packetized communications 24 that correspond to packet sequence nos. 2 and 7 are dropped in order, the quality monitor may elect a coding scheme better suited to maintain a high level of perceived quality when occasional packetized communications 24 are dropped. Additionally, when packetized communications 24 contain routing information, a determination can be made as to the network segment at which the packetized communications corresponding to the dropped packet sequence numbers. Then, the dropping network segment may be removed if possible from the communication pathway. In an instance where this is not possible, the quality monitor may direct an alternative communication pathway such as that provided by bypass network 606B of FIG. 6B.

FIG. 12B indicates that while no packetized communications 24 were dropped, latency problems caused the packetized communications to be received out of sequence. As shown here, the packetized communications corresponding to packet sequence nos. 7, 6, 5, and 2 were received out of order. In certain cases, these packets will be discarded. These packetized communications are analyzed to determine the root cause of their delay and the network impediment, which may be removed, if possible, or a coding scheme revised to handle packetized communications received out of order while still allowing the perceived quality of the communication to remain high. Alternatively, a bypass network may be utilized if reconfiguring the communication pathway and revising the coding scheme does not provide the desired level of service.

Figure 13A:
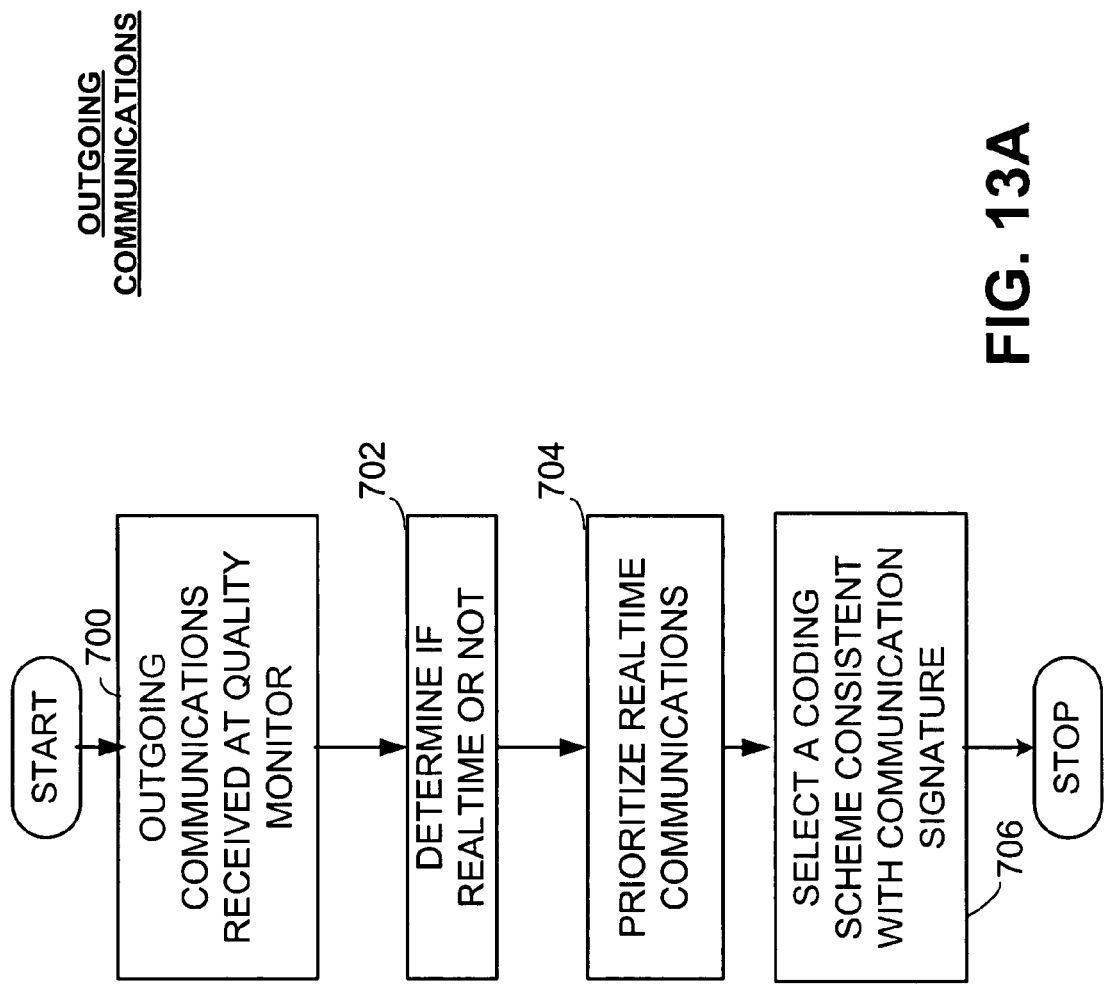
FIGS. 13A and 13B depict process flows associated with quality monitoring.

FIG. 13A provides a process flow by which the quality monitors associated with either the APs or quality-monitoring modules within the network are able to receive outgoing communications at the quality monitor (processor) in step 700. The quality monitor determines, based on the communication signature associated with the outgoing communications, whether or not the communication is a real-time communication in step 702. In which case, real-time communications are prioritized at step 704 and non-real-time communications may be delayed dependent upon the bandwidth requirement of current communications. Then, a coding scheme consistent with the communication signature or communication pathway consistent with the communication signature may be selected at step 706. The process continually repeats for ongoing communications in order to ensure that the highest possible level of communications is provided to the end user.

Figure 13B:
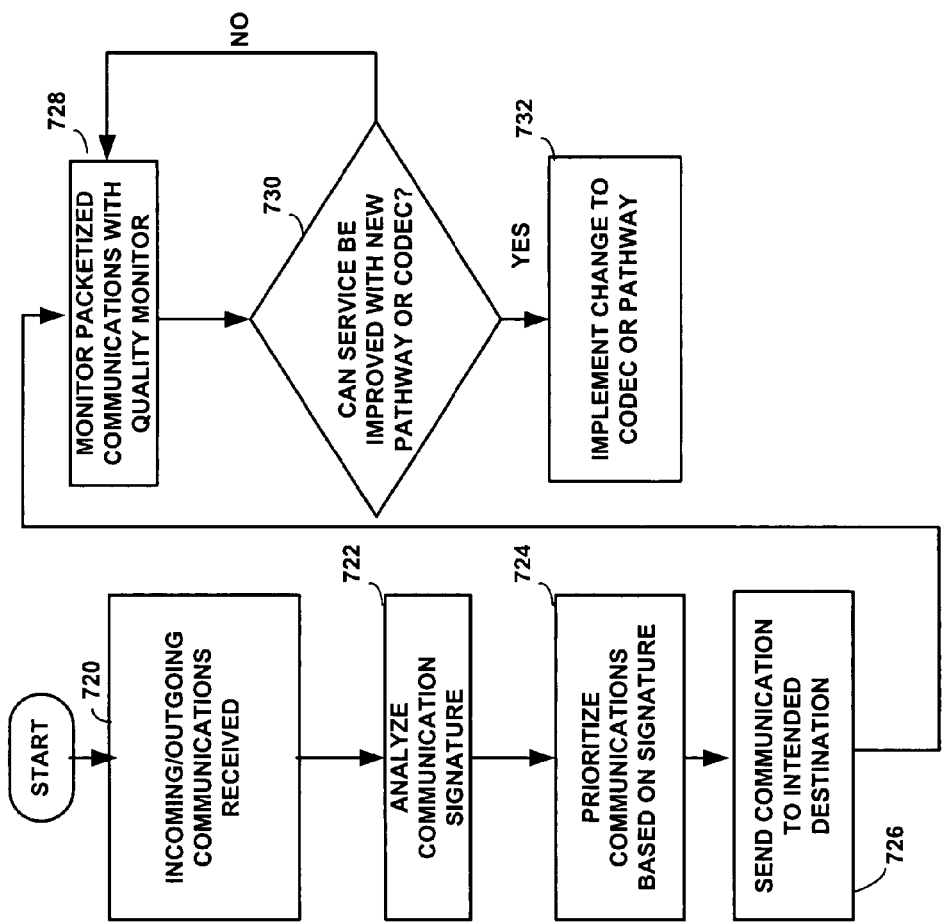

FIG. 13B also provides a process flow wherein communications are received by a quality monitor at Step 720. Communications signatures are analyzed at Step 722 in order to prioritize the communications and send them to their intended destination at steps 724 and 726 respectively. The quality monitor continuously monitors these communications at step 728 and evaluates whether or not service can be improved with either a new communication pathway or coding scheme at step 730. If service may be improved, the necessary change is implemented at step 732. Otherwise, the evaluation process continues at step 728.

In summary, this disclosure provides the ability to incorporate quality monitors either into wireless terminals, wireless access points, or other network modules. These quality monitoring functions monitor, in real-time, the measured and perceived quality of real-time communications. In addition to monitoring these levels of quality, communication pathways and coding schemes may be dynamically reconfigured to improve the measured and perceived level of quality. This has particular applications to VOIP and other like streaming multimedia applications. Such applications enable providers to maintain a high level of user satisfaction while minimizing the impact on network resources. Additionally, quality monitors support dynamic mixed usage of network bandwidth such that voice data and other multimedia communications are prioritized based on their immediate need when compared to other data communications. Thus, the quality monitors support dynamic bandwidth sharing amongst the different types of communications. This ability minimizes network-operating costs and provides real-time communications such as VOIP at quality levels that can reach or exceed traditional telephony levels.

Although the present invention is described in detail, it should be understood that various changes, substitutions and alterations can be made hereto without departing from the spirit and scope of the invention as described by the appended claims.

What is claimed is:

1. A method of servicing real-time communications to a Wireless Local Area Network (WLAN) terminal, comprising:
   receiving incoming and outgoing user communications at a user interface of a WLAN terminal;
   selecting an initial coding scheme from a plurality of supported coding schemes with a programmable COder/DECoder (CODEC), each of the plurality of supported coding schemes being associated with a different one of a plurality of codec protocols;
   converting incoming user communications from packetized communications and outgoing user communications to packetized communications according to the selected coding scheme;
   exchanging packetized communications between a servicing Access Point (AP) of the WLAN and the WLAN terminal at a communication quality level;
   measuring the communication quality level of an uplink path from the WLAN terminal to the AP, the communication quality level being based on latency of the outgoing user communications received at the AP; and
   revising the selected coding scheme for both the incoming user communications and the outgoing user communications from the plurality of supported coding schemes based upon only the communication quality level of the uplink path.

2. The method of claim 1, further comprising:
   exchanging packetized communications between the WLAN terminal and a far-end terminal;
   monitoring a communication quality level between the WLAN terminal and the far-end terminal to determine the communication quality level delivered between the WLAN terminal and the far-end terminal; and
   revising the selected coding scheme from the plurality of supported coding schemes based upon the communication quality level delivered between the WLAN terminal and the far-end terminal.

3. The method of claim 2, wherein the supported coding schemes comprise at least one audio and/or video coding scheme selected from the group consisting of Huffman encoding, ITU-T G.711, u-law, A-law, CCITT G.721, CCITT G.723, ITU-T G.726, ITU-T G.723.1, ITU-T G.723.1A, ITU-T G.729, ITU-T G.729A, ITU-T G.729AB, ITU-T G.729E, ITU-T G.728, ITU-T G.722, ITU-T G.722.1, ITU-T G.722.2, GSM-EFR, GSM AMR, IMA/DVI ADPCM, Microsoft ADPCM, LPC-10E, CELP GSM 06.10, shorten, Real Audio, MPEG, ACE and MACE.

4. The method of claim 2, further comprising monitoring the latency of a jitter buffer to determine the communication quality level between the AP and WLAN terminal.

5. The method of claim 1, further comprising interacting with the far-end terminal to revise the selected coding scheme.

6. The method of claim 1, further comprising monitoring a plurality of APs by the wireless terminal and selecting the servicing AP based upon an expected service quality level.

7. The method of claim 6, wherein monitoring the plurality of APs further comprises:
   querying at least one of the plurality of APs to determine the expected service quality level from the AP; and
   registering with a new servicing AP when the expected service quality level to be provided by the new servicing AP exceeds the expected service quality level provided by the servicing AP by a predetermined service quality level.

8. The method of claim 1, wherein the user communications are audio communications.

9. The method of claim 1, wherein the user communications are audiovisual communications.

10. The method of claim 1, wherein the audiovisual communications are video conferencing communications.

11. The method of claim 1, wherein the user communications are video communications.

12. A Wireless Local Area Network (WLAN) terminal, comprising:
   a wireless interface that communicates with a servicing Access Point (AP) of the WLAN to service packetized communications;
   a processing unit communicatively coupled to the wireless interface, whereby the processor communicates with a far-end terminal;
   a programmable COder/DECoder (CODEC) communicatively coupled to and controlled by the processing unit that converts incoming packetized communications to incoming user communications and that converts outgoing user communications to outgoing packetized communications according to a selected coding scheme;
   a user interface communicatively coupled to the programmable CODEC that receives the incoming user communications and that produces the outgoing user communications;
   whereby the processing unit chooses the selected coding scheme for converting both the incoming packetized communications to the incoming user communications and the outgoing user communications to the outgoing packetized communications from a plurality of supported coding schemes, each associated with a different one of a plurality of codec protocols, to be the same as a coding scheme assigned by the AP in response to the AP measuring a communication quality level of an uplink path from the WLAN terminal to the AP, the communication quality level being based on latency of the outgoing user communications received at the AP, the selected coding scheme being assigned based upon only the communication quality level of the uplink path.

13. The WLAN terminal of claim 12, wherein the supported coding schemes comprise at least one audio and/or video coding scheme selected from the group consisting of Huffman encoding, ITU-T G.711, u-law, A-law, CCITT G.721, CCITT G.723, ITU-T G.726, ITU-T G.723.1, ITU-T G.723.1A, ITU-T G.729, ITU-T G.729A, ITU-T G.729AB, ITU-T G.729E, ITU-T G.728, ITU-T G.722, ITU-T G.722.1, ITU-T G.722.2, GSM-EFR, GSM AMR, IMA/DVI ADPCM, Microsoft ADPCM, LPC-10E, CELP GSM 06.10, shorten, Real Audio, MPEG, ACE and MACE.

14. The WLAN terminal of claim 12, further comprising:
   a jitter buffer whereby the processing unit monitors that latency of the jitter buffer to determine the communication quality level.

15. The WLAN terminal of claim 14, whereby the wireless interface monitors a plurality of APs and selects a servicing AP based upon an expected service quality level.

16. The WLAN terminal of claim 12, whereby the wireless interface:
   monitors a plurality of APs;
   queries at least one of the plurality of APs to determine a service quality that could be provided by the AP; and
   registers with a new AP when a service quality to be provided by the new servicing AP exceeds a service quality provided by the servicing AP by a predetermined service quality level.

17. The WLAN terminal of claim 12, wherein the user communications are audio communications.

18. The WLAN terminal of claim 12, wherein the user communications are audiovisual communications.

19. The WLAN terminal of claim 18, wherein the audiovisual communications are video conferencing communications.

20. The WLAN terminal of claim 12, wherein the user communications are video communications.

21. A Wireless Local Area Network (WLAN) terminal, comprising:
   a wireless interface that communicates with a servicing Access Point (AP) of the WLAN to service packetized communications;
   a processing unit communicatively coupled to the wireless interface;
   a programmable COder/DECoder (CODEC) communicatively coupled to and controlled by the processing unit that converts incoming packetized communications to incoming user communications and that converts outgoing user communications to outgoing packetized communications according to a selected coding scheme;
   a user interface communicatively coupled to the programmable CODEC that receives the incoming user communications and that produces the outgoing user communications;
   whereby the processing unit chooses the selected coding scheme for converting both the incoming packetized communications to the incoming user communications and the outgoing user communications to the outgoing packetized communications from a plurality of supported coding schemes, each associated with a different one of a plurality of codec protocols, to be the same as a coding scheme assigned by the AP in response to the AP measuring a communication quality level of an uplink path from the WLAN terminal to the AP, the communication quality level being based on latency of the outgoing user communications received at the AP, the selected coding scheme being assigned based upon only the communication quality level of the uplink path.

22. The WLAN terminal of claim 21, whereby the processor communicates with a far-end terminal to indicate the selected coding rate.

23. The WLAN terminal of claim 21, wherein the supported coding schemes comprise at least one audio and/or video coding scheme selected from the group consisting of:
   Huffman encoding, ITU-T G.711, u-law, A-law, CCITT G.721, CCITT G.723, ITU-T G.726, ITU-T G.723.1, ITU-T G.723.1A, ITU-T G.729, ITU-T G.729A, ITU-T G.729AB, ITU-T G.729E, ITU-T G.728, ITU-T G.722, ITU-T G.722.1, ITU-T G.722.2, GSM-EFR, GSM AMR, IMA/DVI ADPCM, Microsoft ADPCM, LPC-10E, CELP GSM 06.10, shorten, Real Audio, MPEG, ACE and MACE.

24. The WLAN terminal of claim 21, further comprising:
a jitter buffer
whereby the processing unit monitors the latency of the jitter buffer to determine the communication quality level.

25. The WLAN terminal of claim 21, whereby the processing unit further interacts with a far-end terminal in choosing the selected coding scheme.

26. The WLAN terminal of claim 21, whereby the wireless interface monitors a plurality of APs and selects a servicing AP based upon an expected service quality level.

27. The WLAN terminal of claim 21, whereby the wireless interface:
monitors a plurality of APs;
queries at least one of the plurality of APs to determine a service quality that could be provided by the AP; and
registers with a new AP when a service quality to be provided by the new servicing AP exceeds a service quality provided by the servicing AP by a predetermined service quality level.

28. The WLAN terminal of claim 21, wherein the user communications are audio communications.

29. The WLAN terminal of claim 21, wherein the user communications are audiovisual communications.

30. The WLAN terminal of claim 29, wherein the audiovisual communications are video conferencing communications.

31. The WLAN terminal of claim 21, the user communications are video communications.

* * * * *

UNITED STATES PATENT AND TRADEMARK OFFICE
CERTIFICATE OF CORRECTION

| | |
|---|---|
| PATENT NO. | : 8,094,629 B2 |
| APPLICATION NO. | : 10/780146 |
| DATED | : January 10, 2012 |
| INVENTOR(S) | : Richard A. Bye |

Page 1 of 1

It is certified that error appears in the above-identified patent and that said Letters Patent is hereby corrected as shown below:

Col. 16, line 12 in claim 31: after "claim 21," insert --wherein--

Signed and Sealed this
Twelfth Day of March, 2013

Teresa Stanek Rea
*Acting Director of the United States Patent and Trademark Office*